(12) United States Patent
Liu et al.

(10) Patent No.: US 12,506,206 B2
(45) Date of Patent: Dec. 23, 2025

(54) BATTERY PACK AND METHOD

(71) Applicant: TECHTRONIC CORDLESS GP, Anderson, SC (US)

(72) Inventors: Ya Bin Liu, Dongguan (CN); Jiang Zhao, Dongguan (CN); Jian Guo Zhao, Dongguan (CN)

(73) Assignee: TECHTRONIC CORDLESS GP, Anderson, SC (US)

( * ) Notice: Subject to any disclaimer, the term of this patent is extended or adjusted under 35 U.S.C. 154(b) by 490 days.

(21) Appl. No.: 16/644,147

(22) PCT Filed: Nov. 15, 2019

(86) PCT No.: PCT/CN2019/118742
§ 371 (c)(1),
(2) Date: Mar. 3, 2020

(87) PCT Pub. No.: WO2021/092886
PCT Pub. Date: May 20, 2021

(65) Prior Publication Data
US 2021/0151721 A1    May 20, 2021

(51) Int. Cl.
*H01M 50/213* (2021.01)
*H01M 50/284* (2021.01)

(52) U.S. Cl.
CPC ....... *H01M 50/213* (2021.01); *H01M 50/284* (2021.01); *H01M 2220/30* (2013.01)

(58) Field of Classification Search
CPC ... H01M 50/209–216; H01M 2220/30; H01M 50/213; H01M 50/284; H01M 50/287; H01M 50/519
See application file for complete search history.

(56) References Cited

U.S. PATENT DOCUMENTS

| | | | |
|---|---|---|---|
| 7,326,479 B2 | 2/2008 | Nishimura et al. |
| 7,364,817 B2 | 4/2008 | Lee |
| 8,092,932 B2 | 1/2012 | Phillips et al. |
| 8,703,325 B2 | 4/2014 | Pellenc |
| 8,822,065 B2 | 9/2014 | Byun et al. |
| 9,412,992 B2 | 8/2016 | Song et al. |

(Continued)

FOREIGN PATENT DOCUMENTS

| CA | 3126409 A1 | 8/2020 |
|---|---|---|
| CN | 102057519 A | 5/2011 |

(Continued)

OTHER PUBLICATIONS

Machine translation of JP 2015141800 A (Year: 2015).*

(Continued)

*Primary Examiner* — Matthew T Martin
*Assistant Examiner* — Grace Ann Kenlaw
(74) *Attorney, Agent, or Firm* — Michael Best & Friedrich LLP

(57) ABSTRACT

There is provided battery cell assembly for a power tool battery pack. The battery cell assembly comprises a cell housing, a battery cell and a cell strap. The battery cell define a pole and is supported by the cell housing. The cell strap comprises a leg for electrically contacting the pole. The cell housing defines a first formation and the cell strap defines a second formation configured to engage the first formation so as to align the leg with the pole.

46 Claims, 12 Drawing Sheets

(56) References Cited

U.S. PATENT DOCUMENTS

| | | | |
|---|---|---|---|
| 9,614,203 B2 | 4/2017 | Naito | |
| 9,620,763 B1 | 4/2017 | Zeng et al. | |
| 10,431,802 B2 | 10/2019 | Fees et al. | |
| 10,497,919 B2 | 12/2019 | Fees et al. | |
| 10,541,403 B2 | 1/2020 | Fees et al. | |
| 10,547,042 B2 | 1/2020 | Fees et al. | |
| 2008/0254356 A1* | 10/2008 | Liersch | H01M 10/425 429/97 |
| 2009/0061302 A1 | 3/2009 | Scott et al. | |
| 2011/0305942 A1 | 12/2011 | Park | |
| 2013/0183571 A1 | 7/2013 | Miyazaki et al. | |
| 2013/0252075 A1 | 9/2013 | Shimizu et al. | |
| 2017/0069897 A1* | 3/2017 | Lee | H01M 50/264 |
| 2017/0149032 A1* | 5/2017 | Lee | H01M 50/503 |
| 2017/0264107 A1 | 9/2017 | Cheon et al. | |
| 2018/0108878 A1 | 4/2018 | Fees et al. | |
| 2018/0108886 A1 | 4/2018 | Fees et al. | |
| 2018/0108895 A1 | 4/2018 | Fees et al. | |
| 2018/0108896 A1 | 4/2018 | Fees et al. | |
| 2018/0108897 A1 | 4/2018 | Fees et al. | |
| 2018/0108899 A1 | 4/2018 | Fees et al. | |
| 2018/0108900 A1 | 4/2018 | Fees et al. | |
| 2018/0108901 A1 | 4/2018 | Fees et al. | |
| 2019/0189982 A1 | 6/2019 | Lee et al. | |
| 2019/0267601 A1* | 8/2019 | Cho | H01M 50/507 |
| 2019/0329825 A1 | 10/2019 | Fees et al. | |
| 2020/0220122 A1* | 7/2020 | Haertel | H01M 50/505 |

FOREIGN PATENT DOCUMENTS

| | | |
|---|---|---|
| CN | 205609608 U | 9/2016 |
| CN | 205811068 U | 12/2016 |
| CN | 206541879 U | 10/2017 |
| CN | 107658510 A | 2/2018 |
| CN | 207368151 U | 5/2018 |
| CN | 207818729 U | 9/2018 |
| EP | 0464251 A1 | 1/1992 |
| JP | 2015141800 A | 8/2015 |
| KR | 20170106933 A | 9/2017 |
| KR | 20180082802 A | 7/2018 |
| WO | 2019059538 A1 | 3/2019 |
| WO | 2019203426 A1 | 10/2019 |

OTHER PUBLICATIONS

Canadian Patent Office Action for Application No. 3,076,657 dated Jun. 3, 2021 (5 pages).
International Search Report and Written Opinion for Application No. PCT/CN2019/118742 dated Aug. 18, 2020 (9 pages).
Canadian Patent Office Action for Application No. 3,076,657 dated Mar. 31, 2022 (5 pages).
Canadian Patent Office Action for Application No. 3,076,657 dated Jan. 12, 2023 (6 pages).
Chinese Patent Office Action for Application No. 201980102278.0 dated Mar. 3, 2023 (8 pages including statement of relevance).
Chinese Patent Office Action for Application No. 201980102278.0 dated Aug. 4, 2023 (12 pages including statement of relevance).
Extended European Search Report for Application No. 19952543.7 dated Jul. 6, 2023 (10 pages).
Australian Patent Office Examination Report No. 1 for Application No. 2019473822 dated Aug. 5, 2025 (4 pages).

* cited by examiner

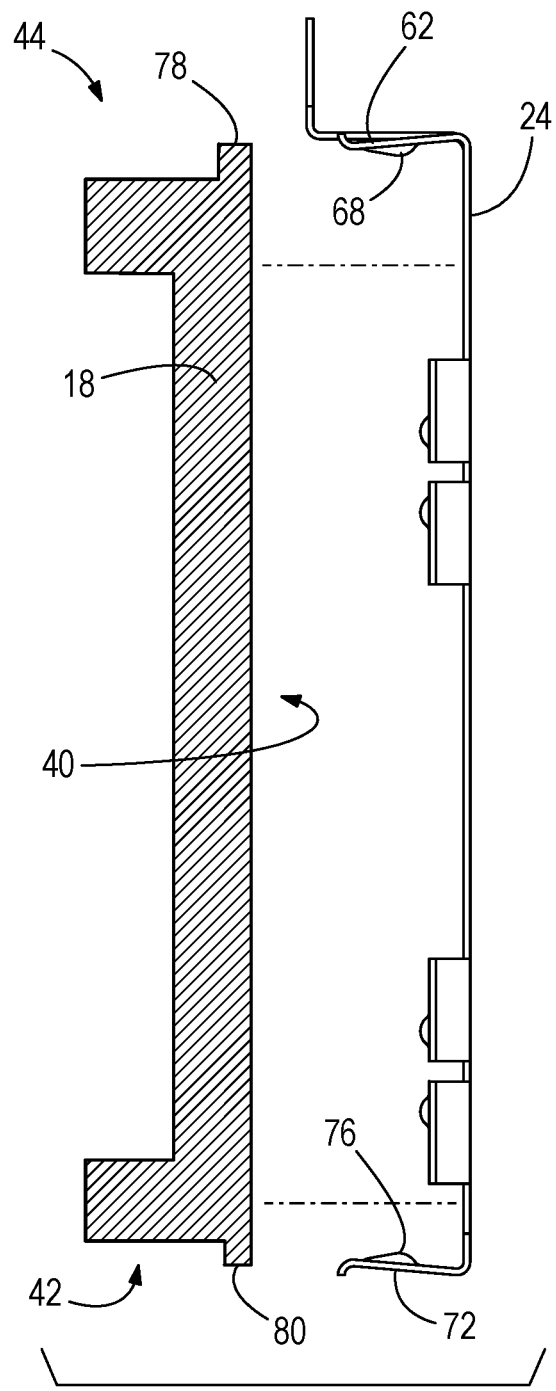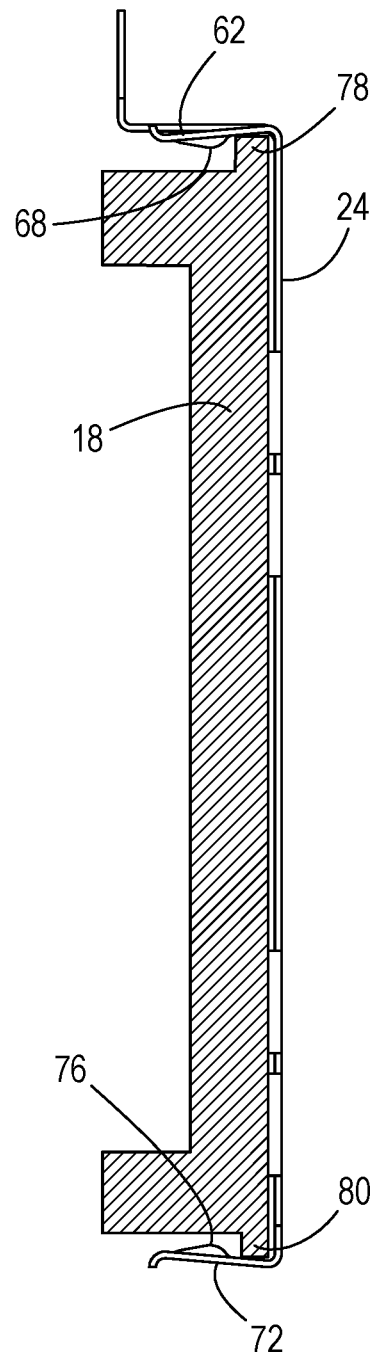
Figure 7
Figure 8

BATTERY PACK AND METHOD

CROSS-REFERENCE TO RELATED APPLICATIONS

This application is a national phase filing under 35 U.S.C. 371 of International Application No. PCT/CN2019/118742 filed Nov. 15, 2019, the entire contents of which are incorporated herein by reference.

BACKGROUND

The present invention relates to a battery cell assembly for a power tool battery pack. In particular, the present invention relates to a battery pack comprising a cell strap that is aligned with a pole of a battery cell. The present invention also relates to a cell housing, a cell strap, and a method of manufacturing a battery pack. The present invention further relates to a cell strap which exhibits enhanced electrical transmission.

Battery packs typically comprise one or more battery cells supported by a cell housing, and one or more cell straps. The cell straps form an electrical connection between the poles (i.e. positive and negative electrical terminals) of the battery cells and further components of the power tool, such as, for example, control circuitry, electric motors, power level indicator lights or the like. During manufacture the cell straps must be precisely aligned with the battery cells in order to permit the formation of an electrical connection between the battery cells and the cell straps. Misalignment of the battery cells and cell straps may result in a faulty connection (e.g. no electrical connection or an electrical connection exhibiting high electrical resistance). Such battery packs may comprise a relatively large number of battery cells, and consequently a relatively large number of cell straps may be required for electrically connecting the poles of adjacent battery cells. Due to the large number of components and the fact that the components must be precisely aligned with one another, the manufacture and assembly of battery packs is relatively complicated and expensive. It is therefore an object of the present invention to provide an improved or alternative battery pack cell assembly and associated method of manufacture, which, in particular, exhibits reduced complexity and enhanced ease and speed to manufacture.

Cell straps are typically used to connect one or more poles of a battery cell. When a larger number of cells are connected by the cell strap the electrical current transmitted by the cell strap will increase. Increased electrical current may cause the cell strap to heat up, and excessive heating may lead to thermal deformation of the cell strap. It is therefore a further object of the invention to provide an improved cell strap which alleviates the problem of overheating, or to provide an alternative cell strap.

Finally, it is an object of the invention to obviate or mitigate one or more problems associated with the prior art, whether identified herein or elsewhere.

SUMMARY

According to a first aspect of the invention, there is provided a battery cell assembly for a battery pack for use with a power tool, comprising: a cell housing; a battery cell defining a pole and being supported by the cell housing; and a cell strap comprising a leg for electrically contacting the pole; wherein the cell housing defines a first formation and the cell strap defines a second formation configured to engage the first formation so as to align the leg with the pole.

Engaging the second formation with the first formation ensures that the cell strap is placed in a pre-determined (i.e. known or manufacturer-specified) position and/or orientation relative to the cell housing. The geometry of the cell strap, and in particular the leg, can be chosen such that when the second formation engages the first formation the leg is aligned with the pole. Aligning the leg with the pole enables the creation of an electrical connection between the leg and the pole, so that electrical power can be supplied to or taken from the cell via the cell strap. The electrical connection may be created by simple contact between the pole and the cell strap, or may be created after an additional manufacturing step such as welding. The use of the first and second formations removes the requirement for the leg to be aligned with the pole by eye, and helps maintain the cell strap in the desired position and/or orientation whilst additional manufacturing steps, such as joining the leg to the pole, are carried out. Consequently, the first and second formations make the manufacture and assembly of the cell strap with the cell housing is simpler and easier. This is particularly beneficial where the battery cell assembly comprises more than one, or a large number, of battery cells which must be aligned with corresponding legs of one or more cell straps.

It will be appreciated that the term "formation" encompasses any suitable geometry for aligning cell strap and the cell housing. Such a formation may subsist in a single feature (e.g. a single mating surface), or may be formed from a group of features collectively (e.g. a group of different mating surfaces).

One of the first and second formations may comprise a detent, and the other of the first and second formations may be configured to receive the detent. The term "detent" may encompass any suitable mechanism for retaining the cell strap in a fixed position in relation to the cell housing. For example, one of the first and second formations may comprise a spring arm or latch configured, and the other of the first and second formations may be correspondingly shaped to receive the spring arm or latch. The use of a detent forms a mechanically simple connection between the cell strap and the cell housing which is easy to assemble and reliable. The detent may define a rounded shape allowing assembly and disassembly of the cell strap from the cell housing. Alternatively, the detent may define a sharp edged shape permitting assembly but preventing disassembly of the cell strap from the cell housing. The use of a detent enables simple and quick retention of the cell strap to the cell housing. Another example of a suitable detent is a spring-operated ball.

The other of the first and second formations may comprise a lip or a recess for retaining the detent. The lip or recess may define any suitable shape for receiving and/or retaining the detent. Such lips and recesses are mechanically simple structures which allow an easy and reliable connection between the cell strap and the cell housing.

The cell strap may further comprise a body. The second formation may comprise an arm. The detent may be defined by the arm. That is to say, the detent may be positioned on the arm, for example, facing towards the cell housing.

The first formation may define a channel configured to receive the arm so as to limit movement of the cell strap relative to the cell housing. The use of a channel may retain the second formation on two sides and therefore prevents lateral movement of the cell strap relative to the cell housing, thus making assembly simpler and easier and reducing the chance that the cell strap will move before welding.

The cell housing may comprise a boss at least partially defining the channel. In particular, the cell housing may comprise a pair of bosses spaced apart from one another so as to define a channel therebetween. Additionally or alternatively, the cell housing may comprise a recess defining the channel.

The body may be substantially planar and may be configured to mate against an end face of the cell housing. The arm may extend generally orthogonal to the body. Because the arm extends orthogonal to the body, the arm may extend around an edge (i.e. a corner) of the cell housing to enable the arm to grip the cell housing. The arm may extend at an angle of around 70° to around 100° relative to the body, at an angle of around 75° to around 95° relative to the body, or at an angle of around 85° to around 90°, or around 85° relative to the body.

The leg may extend from the body towards the pole of the battery cell. For example, the leg may comprise a stepped portion extending towards the pole. Where the leg extends towards the pole this may make it easier to create an electrical connection between the leg and the pole.

One of the first or the second formations may comprise a through hole and the other of the first and second formations may comprise a correspondingly shaped protrusion configured to be received by the through hole. The use of a protrusion received within a through hole ensures that the cell housing is aligned with the cell housing and prevents movement of the cell strap relative to the cell housing. The through hole constrains the protrusion on all sides and therefore prevents movement of the cell strap relative to the cell housing in any lateral direction.

The cell strap may further comprise a body and a flange. The second formation may be at least partially defined by the flange. As described above, the body may be substantially planar and may be configured to mate against an end face of the cell housing.

The flange may extend generally orthogonal to the body. When the flange is orthogonal to the body, the flange may extend around the corner of the cell housing.

The first formation may comprise a boss or a channel configured to engage the flange so as to limit movement of the cell strap relative to the cell housing.

The flange may define a terminal configured to form an electrical connection with a component of the battery pack. For example, for providing power to or receiving power from a PCB, motor, control system or the like.

The cell housing may define an aperture aligned with the pole of the battery cell. The aperture may therefore permit the creation of an electrical connection between the leg and the pole.

The battery cell may be a first battery cell and the leg may be a first leg. The battery pack may comprise a second battery cell. The cell strap may comprise a second leg. When the first formation engages the second formation the second leg may be aligned with the second pole. Alignment of the second leg with the second pole may, in particular, permit the creation of an electrical connection between the second leg and the second pole.

The cell housing may define a third formation and the cell strap may define a fourth formation configured to engage the first formation so as to align the leg with the pole. The use of additional formations provides further points of engagement between the cell strap and the cell housing, and thus improves the stability and accuracy of the alignment between the cell strap and the cell housing. The third formation may be substantially identical to the first formation and the fourth formation may be substantially identical to the second formation. In further embodiments, the cell housing and the cell strap may comprise substantially any suitable number of mating formations. In general, the more sets of mating formations that are used, the greater the stability and the degree of control over the alignment of the cell strap and the cell housing.

The cell housing may comprise a first side and a second side opposite the first side. The first side may define the first formation and the second side may define the third formation. That is to say, the third formation may be positioned at on an opposite side of the cell housing to the first formation.

The cell strap may define a first end and a second end opposite the first end. The first end may define the second formation and the second end may define the fourth formation. That is to say, the fourth formation may be positioned at an opposite end of the cell strap to the second formation. When each pair of mating formations is positioned on an opposite side of the cell housing and/or cell strap, the mating formations are spaced apart from one another and therefore the stability and accuracy of the alignment between the cell strap and the cell housing is improved.

According to a second aspect of the invention, there is provided a cell strap for a battery pack for a power tool, comprising: a leg for electrically contacting a pole of a battery cell, and a formation configured to engage a corresponding formation of a cell housing and to align the leg with the pole.

The formation may comprise a detent configured to be retained by the second formation. The detent may be rounded. The formation may further comprise an arm, and the detent may be defined by the arm. The cell strap may further comprise a body, and the arm may extend generally orthogonal to the body. The arm may extend at an angle of around 70° to around 100°, around 75° to around 95°, or around 85° relative to the body. The body may be generally planar. The formation may comprise a flange. The formation may comprise a through hole configured to receive a corresponding protrusion of the cell housing. The cell strap may comprise a second formation configured to engage a corresponding formation of the cell housing.

According to a third aspect of the invention there is provided a cell housing for a battery pack for a power tool, comprising: a body defining a socket for receiving and supporting a battery cell; wherein the body defines an aperture positioned so as to be aligned with a pole of the battery cell; and wherein the body further defines a formation for engaging a corresponding formation of a cell strap.

The formation may comprise a lip. The formation may comprise a channel for receiving a corresponding arm or flange of the cell strap. The channel may be defined by a recess. The channel may be defined by one or more bosses.

The body may define a first side and a second side opposite the first side. The formation may be defined by the first side. The second side may define a further formation for engaging a further corresponding formation of the cell strap.

According to a fourth aspect of the invention there is provided a method of manufacturing a cell assembly for a battery pack, comprising: providing a cell housing having a first formation; supporting a battery cell using the cell housing; providing a cell strap comprising a second formation and a leg; engaging the first formation with the second formation to align the leg with the pole; and creating an electrical connection between the leg and the pole. The electrical connection may be permanent or non-permanent. A permanent electrical connection may encompass soldering, welding, or otherwise electrically adhering the leg to the pole. A non-permanent electrical connection may encompass surface contact between the leg and the pole. The electrical connection may be formed when the leg is aligned with the pole, or may be formed after the application of a further assembly step, such as for example soldering, welding, pressing or the like.

Creating an electrical connection may comprise permanently joining the leg to the pole. Permanently joining the leg to the pole may comprise welding or soldering the leg to the pole. The cell holder may comprise an aperture and the method may further comprise aligning the pole with the aperture.

According to a fifth aspect of the invention there is provided a battery pack comprising a cell housing according to the first aspect of the invention. According to a sixth aspect of the invention there is provided a battery pack comprising a cell strap according to the second aspect of the invention. According to a seventh aspect of the invention there is provided a battery pack comprising a cell housing according to the third aspect of the invention.

It will be appreciated that any of the technical features of the cell assembly of the first aspect of the invention may be applied to the cell strap of the second aspect of the invention and/or the cell housing of the third aspect of the invention and vice versa. Furthermore, any of the technical features of the cell assembly, cell strap and cell housing of the first to third aspects of the invention may be applied to the method of the fourth aspect of the invention.

According to an eighth aspect of the invention there is provided a cell strap for a battery for a power tool, comprising: a first contact portion for electrically connecting to a first battery cell and defining an input flux area, a second contact portion for electrically connecting to a second battery cell and defining an output flux area, and a body configured to conduct electricity from the first contact portion to the second contact portion and defining a body flux area, wherein the body flux area is greater than the input flux area and/or output flux area.

The term "flux area" shall be taken to encompass a cross-sectional area of the body material perpendicular to the direction of flow of electrical current through the body material (i.e. the material forming the cell strap). The "input flux area" may be defined as the total flux area for current being input to the body and the "output flux area" may be defined as the total flux area for current being output to the body. The "body flux area" may be defined as the cross-sectional area of the cell strap at the widest point of the body.

Because the body flux area is greater than the input flux area and/or the output flux area, a relatively large flux area is available for electrical current transmission through the body and therefore the body exhibits a lower electrical resistance. The lower electrical resistance means that the body is less likely to overheat and potentially warp or buckle due to thermal expansion.

The body flux area may be greater than or equal to around 1.5 times, around 2 times, or around 3 times the input flux area and/or output flux area.

It will be appreciated that any of the technical features described herein in relation to the cell strap of the first or second aspects of the invention may be applied to the cell strap of the eighth aspect of the invention and vice versa.

A detailed description of the invention is provided below with reference to the accompanying drawings.

BRIEF DESCRIPTION OF THE DRAWINGS

FIG. 7 is an exploded cross-sectional side view of a portion of a cell housing according to the present invention and the cell strap of FIG. 5;

FIG. 8 is an assembled cross-sectional side view of the cell housing and the cell strap of FIG. 7;

DETAILED DESCRIPTION

Figure 1:
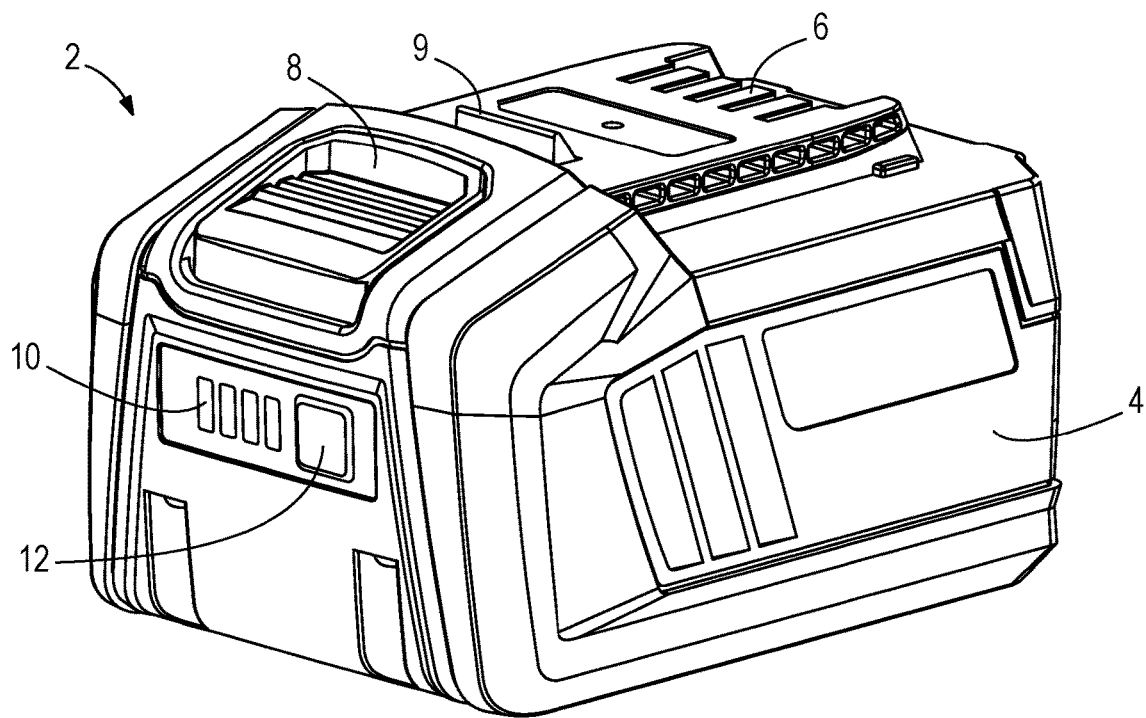
FIG. 1 is a perspective view of a battery pack for a power tool according to the present invention.

FIG. 1 shows a removable battery pack 2 for a power tool. The battery pack 2 may be for use with substantially any suitable power tool, such as for example a drill/driver, angle grinder, caulk gun, electric screwdriver, reciprocating saw, circular saw, rotary hammer, impact wrench, jigsaw or the like. The battery pack 2 comprises a main housing 4, a battery interface 6, a latch button 8, a latch member 9, a power level indicator 10, and an input button 12. The main housing 4 functions as an outer casing for supporting and enclosing the components of the battery pack 2. The battery interface 6 permits the battery to form a mechanical and electrical connection with a power tool (not shown) so that the battery may by retained by and supply electrical power to the power tool. The latch member 9 is configured to form a mechanical connection with the power tool, which can be released by depressing the button 8. The power level indicator 10 comprises four LEDs which are configured to light up in sequence to indicate the total amount of power remaining in the battery, so that the user can determine whether the battery needs charging. The input button 12 generates a control signal in response to actuation of the input button 12 by the user, and can be used to cause the power level indicator to light up, or to change an operating mode of the battery pack 2 (e.g. to select a fast charging mode or the like).

Figure 2:
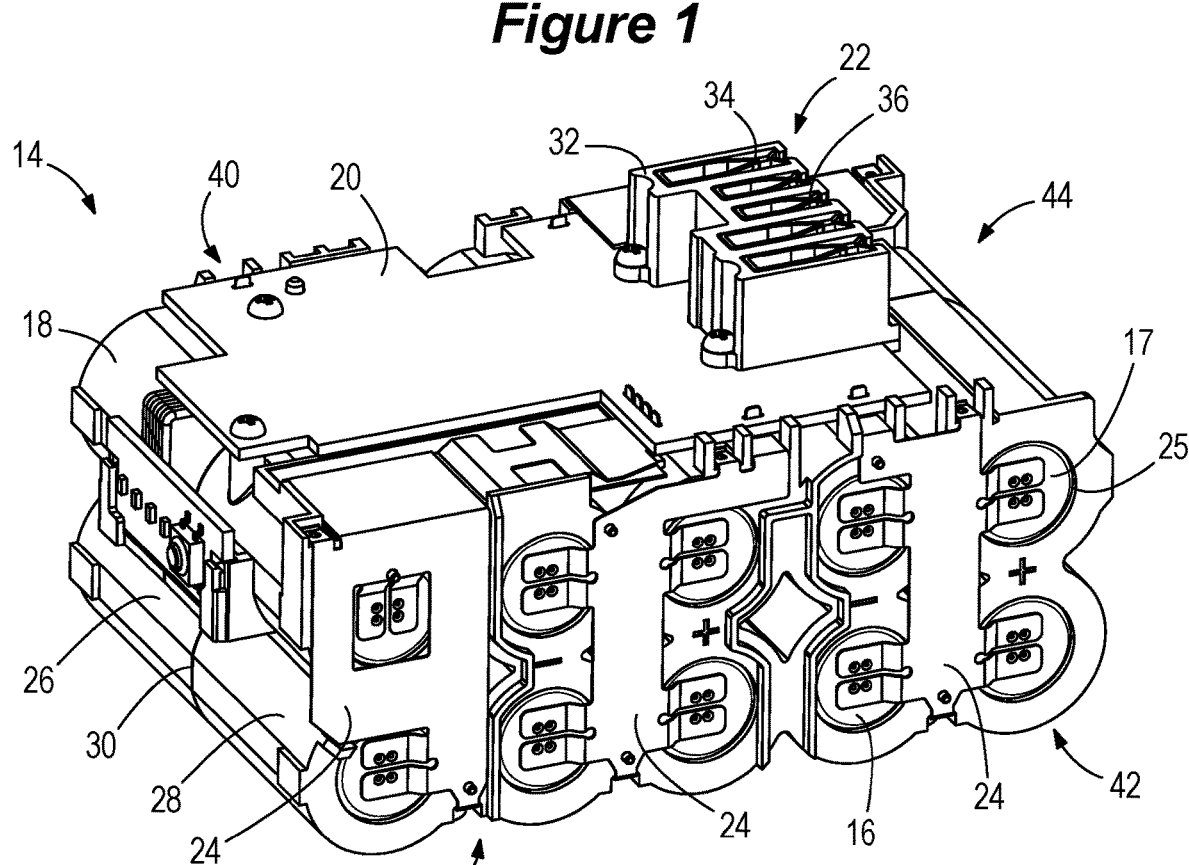
FIG. 2 is a perspective view of an interior of a battery cell assembly according to the present invention.

FIG. 2 shows a battery cell assembly 14 of the battery pack 2. The battery cell assembly 14 is contained within the main housing 4 of the battery pack 2, which has been omitted for clarity. The battery cell assembly 14 comprises a plurality of battery cells 16, a cell housing 18, a circuit board 20, a terminal assembly 22, and a plurality of cell straps 24. In particular, the battery cell assembly comprises ten individual (i.e. distinct and separate) battery cells 16 which are arranged parallel to one another in two rows, each row comprising five cells 16. The battery cells 16 are generally cylindrical and define poles 17 (i.e. positive and negative poles) at their longitudinally opposite ends. The battery cells 16 are received within correspondingly shaped cylindrical sockets of the cell housing 18, each of the sockets defining an aperture 25 through which the poles 17 are exposed. The cell housing 18 comprises a first cell housing portion 26 and a second cell housing portion 28, separate to the first cell housing portion 26. The first and second cell housing portions 26, 28 come together in a clamshell configuration to fully encapsulate the battery cells 16, and are separated from one another by a split line 30. The cell housing 18 is made of an electrically insulating material such as plastic.

The circuit board 20 supports control electronics (not shown) and the terminal assembly 22 thereupon. The control electronics may comprise, for example, a microcontroller or any suitable electronic components for controlling operation of the battery pack 2. The terminal assembly 22 comprises a terminal assembly housing 32 defining a plurality of receptacle spaces 34 each of which contains a separate electrical terminal 36. The electrical terminals 36 are "female" type terminals (i.e. electrical receptacles), and are configured to receive corresponding "male" type electrical terminals of a power tool or other device with which the battery pack 2 is connected (e.g. a charging device) to transmit electrical energy therebetween. The terminal assembly 22 may comprise any suitable number of electrical terminals 36 as may be required.

With continued reference to FIG. 2, the cell housing 18 defines a first end 38 and a second end 40 positioned at longitudinally opposite ends of the battery cells 16. The cell housing 18 further defines a lower side 42 and an upper side 44. The upper side 44 supports the circuit board 20 thereon, and the lower side 42 defines the underneath of the cell housing 18.

Figure 3:
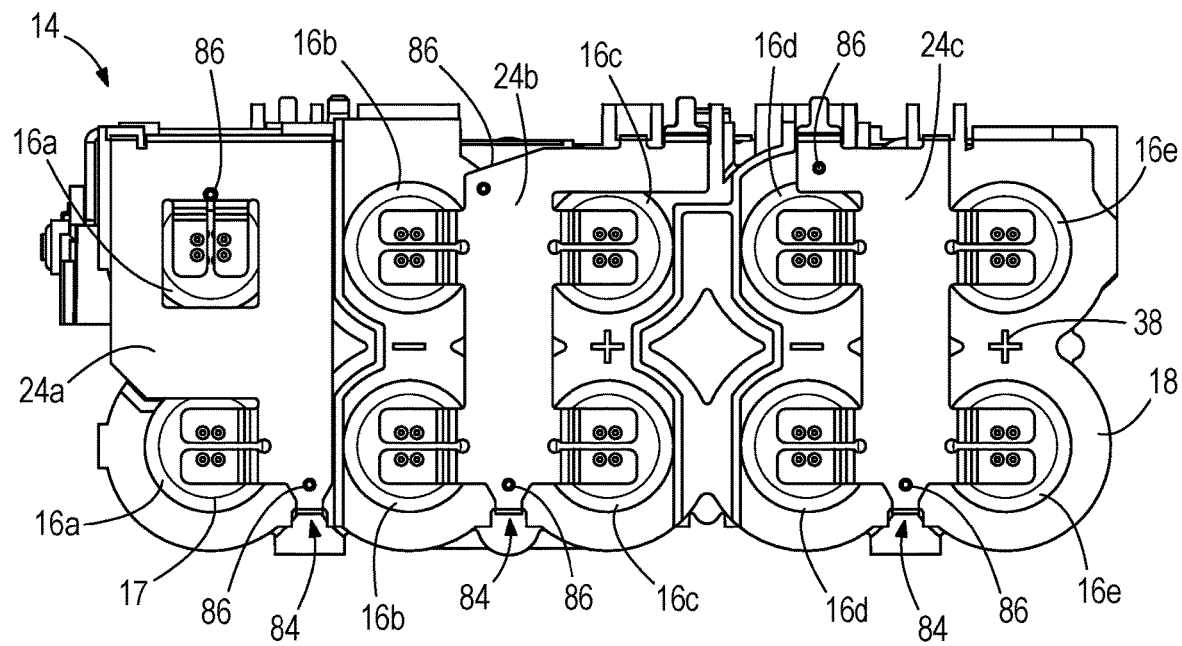
FIG. 3 shows a plan view of a first end of the battery cell assembly of FIG. 2.

Turning now to FIG. 3, the first end 38 of the cell housing 18 is shown in plan view. The cell assembly 14 comprises, from left to right in FIG. 3, a first cell strap 24a, a second cell strap 24b, and a third cell strap 24c. The cell straps 24 are made from an electrically conductive material, preferably metal, for example copper, copper alloy, nickel, steel or the like. The first cell strap 24a electrically connects a first pair of battery cells 16a. The first pair of battery cells 16a are arranged with their positive poles 17 facing towards the first end 38 of the cell housing 18, such that the first cell strap 24a connects the positive poles 17. The second cell strap 24b electrically connects a second pair of battery cells 16b and a third pair of battery cells 16c. The second pair of battery cells 16b are arranged with their negative poles 17 facing towards the first end 38 of the cell housing 18, and the third pair of battery cells 16c are arranged with their positive poles 17 facing towards the first end 38 of the cell housing 18. The second cell strap 24b therefore connects the negative poles 17 of the second pair of battery cells 16b to the positive poles 17 of the third pair of battery cells 16c. The third cell strap 24c electrically connects a fourth pair of battery cells 16d and a fifth pair of battery cells 16e. The fourth pair of battery cells 16d are arranged with their negative poles 17 facing towards the first end 38 of the cell housing 18, and the fifth pair of battery cells 16e are arranged with their positive poles 17 facing towards the first end 38 of the cell housing 18. The third cell strap 24c therefore connects the negative poles 17 of the fourth pair of battery cells 16d to the positive poles 17 of the fifth pair of battery cells 16e.

Figure 4:
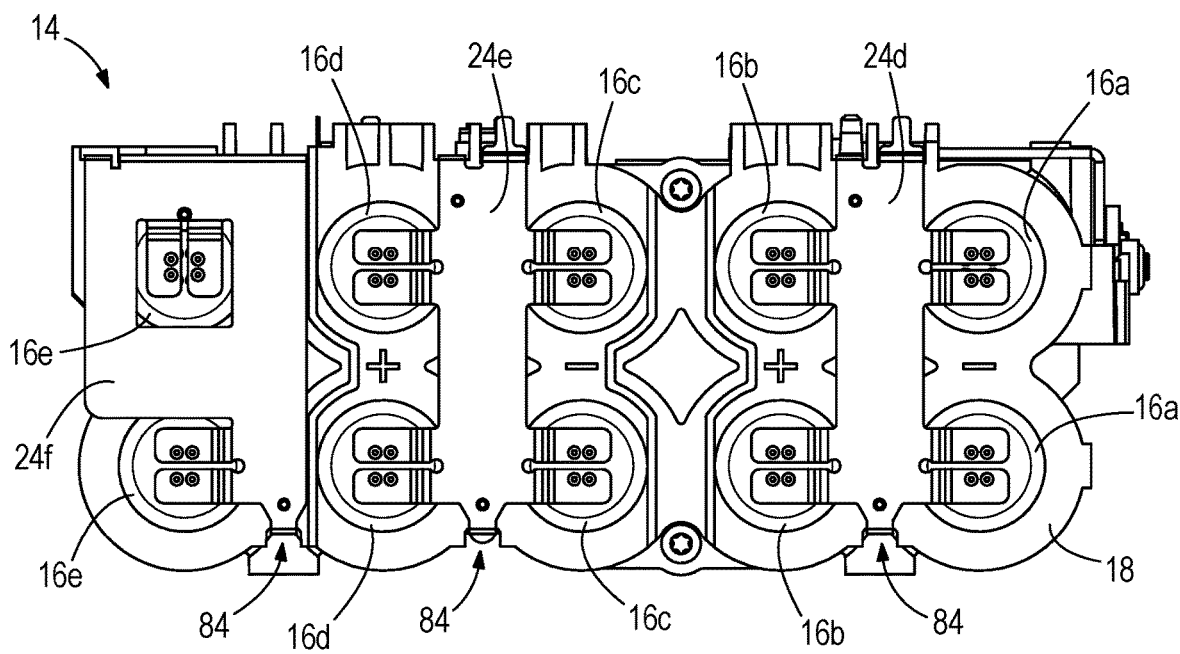
FIG. 4 shows a plan view of a second end of the battery cell assembly of FIG. 2.

Turning to FIG. 4, the second end 40 of the cell housing 18 is shown in plan view. The cell assembly comprises, from right to left in FIG. 4, a fourth cell strap 24d, a fifth cell strap 24e, and a sixth cell strap 24f. The fourth cell strap 24d electrically connects the negative poles 17 of the first pair of battery cells 16a to the positive poles 17 of the second pair of battery cells 16b. The fifth cell strap 24e electrically connects the negative poles 17 of the third pair of battery cells 16c to the positive poles 17 of the fourth pair of battery cells 16d. The sixth cell strap 24f electrically connects the negative poles 17 of the fifth pair of battery cells 16e. It will be appreciated from the foregoing description that within each pair of battery cells 16a-e, the battery cells themselves are electrically connected in parallel to one another by the associated cell straps 24a-f, and that each pair of battery cells 16a-e is electrically connected in series to an adjacent pair of battery cells 16a-e. As such, the first cell strap 24a defines a positive electrical terminal of the battery cell assembly 14 and the sixth cell strap 24f defines a negative electrical terminal of the battery cell assembly 14. The first cell strap 24a and the sixth cell strap 24f are electrically connected to other components of the battery pack 2, for example the terminal assembly 22, for providing power to a power tool to which the battery is connected or for receiving power from a battery charger.

Figure 5:
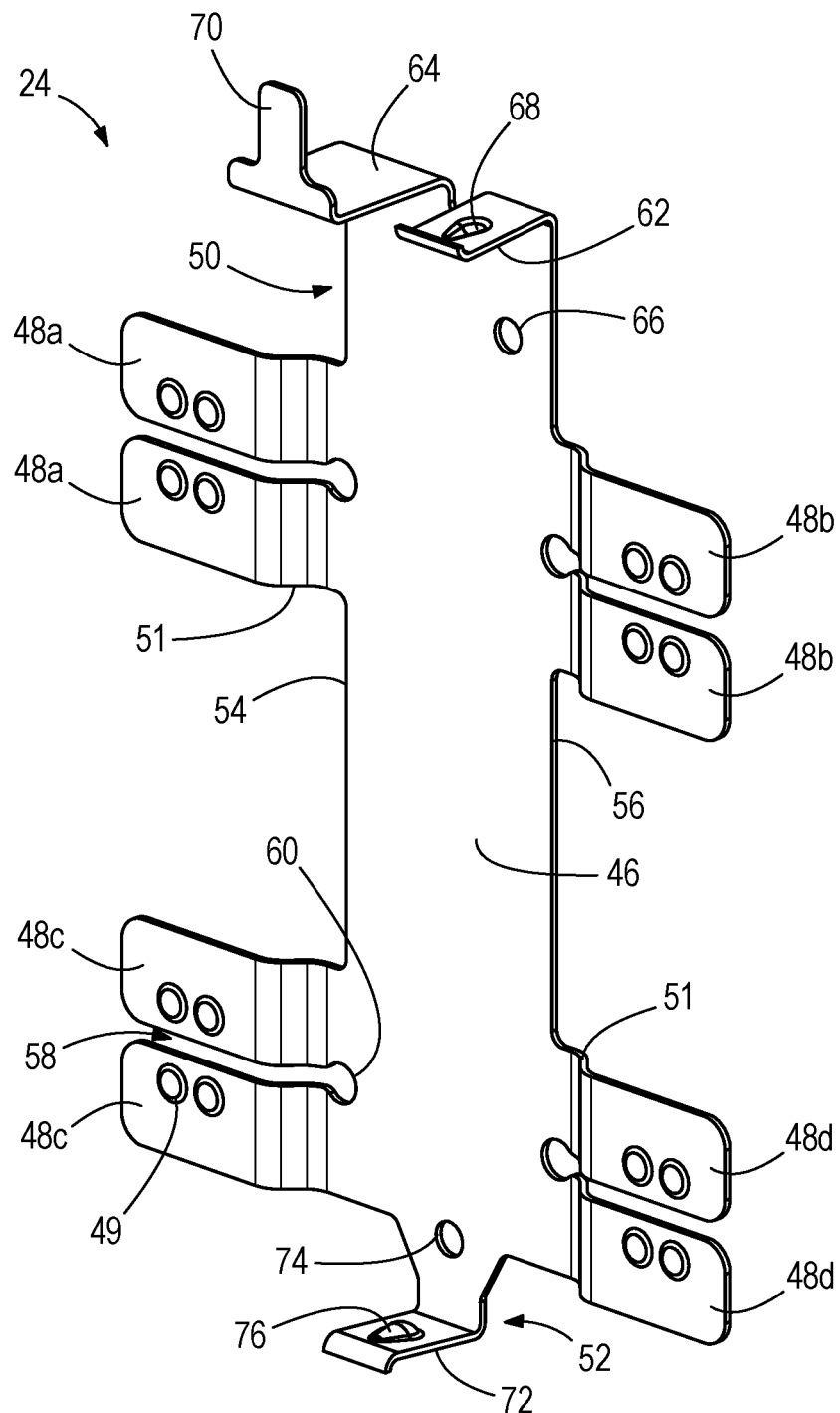
FIG. 5 shows a perspective view of a cell strap according to the present invention.

FIG. 5 shows a perspective view of a cell strap 24 for use with the battery cell assembly 14. The cell strap 24 shown in FIG. 5 may, in particular, be employed as the fourth cell strap 24d or fifth cell strap 24e show in FIG. 4. However, it will be appreciated that the features described below in relation to the cell strap 24 of FIG. 5 may be applied to any of the other cell straps 24 described above in relation to FIGS. 3 and 4.

The cell strap 24 comprises a planar body 46 defining an upper end 50 and a lower end 52 positioned at longitudinally opposite ends of the body 46. The cell strap 24 further comprises eight legs 48 arranged in pairs. A first pair of legs 48a extends from a first edge 54 of the body 46 adjacent the upper end 50. A second pair of legs 48b extends from a second edge 56 of the body 46 adjacent the upper end 50. A third pair of legs 48c extends from the first edge 54 adjacent the lower end 52. A fourth pair of legs 48d extends from the second edge 56 adjacent the lower end 52. Each pair of legs 48 is separated by a gap 58 which provides improved welding performance and reliability when joining the legs 48 to the poles 17. The innermost end of each gap 58 defines an enlarged radiused portion 60 which is configured to reduce local stress concentrations in the region joining the legs 48. Each of the legs 48 comprises a pair of protrusions 49 which are configured to create an electrical connection between the legs 48 and a pole 17 of an adjacent battery cell 16. The legs 48 further comprise stepped portions 51 which extend generally in the direction of the cells 16 when the cell strap 24 is assembled with the cell housing 18 so as to enable the legs 48 to contact the poles 17 of the cells 16.

The upper end 50 of the cell strap 24 comprises a first arm 62, a flange 64, and a first through hole 66. The first arm 62 and the flange 64 both extend generally orthogonal relative to the body 46. The first arm 62 comprises a first detent 68 which is formed as an indentation in the first arm 62 extending downwardly in the perspective of FIG. 5 and generally towards the lower end 52 of the cell strap 24. The flange 64 comprises a terminal portion 70 extending generally parallel to the body 46. The terminal portion 70 is configured to form an electrical connection with the other components of the battery cell assembly 14, such as, for example, the circuit board 20. In particular, the terminal portion 70 may be used to monitor the voltage flowing through the cell strap 24 to ensure the voltage is balanced between the cells 16 during charging and discharging. The lower end 52 of the cell strap 24 comprises a second arm 72 and a second through hole 74. The second arm 72 extends generally orthogonal relative to the body 46. The second arm 72 comprises a second detent 76 which is formed as an indentation in the second arm 72 extending upwardly in the perspective of FIG. 5 and generally towards the upper end 50 of the cell strap 24.

Figure 6:
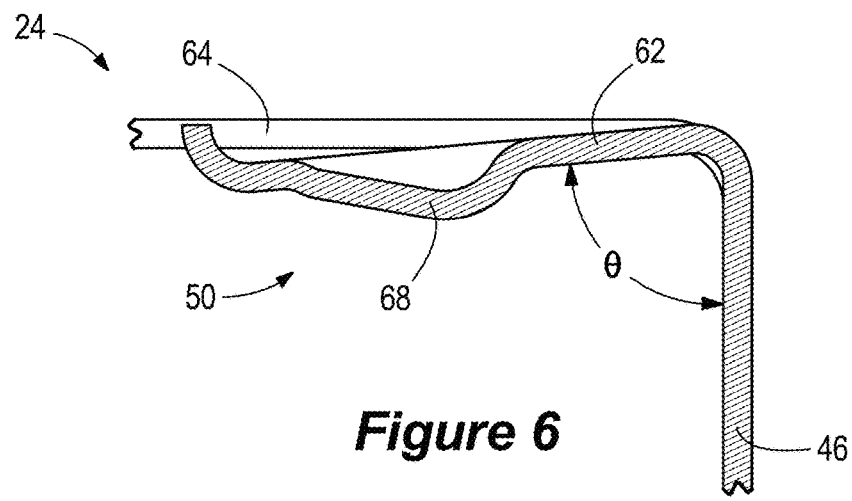
FIG. 6 is an enlarged cross-sectional view of an upper end of the cell strap of FIG. 5.

FIG. 6 shows an enlarged cross-sectional view of the upper end 50 of the cell strap 24. The first arm 62 is bent relative to the body 46 and defines an angle θ therebetween. As set out above, the first arm 62 and the flange 64 extend generally orthogonal to one another. In this context, "generally orthogonal" encompasses the angle θ being in the range of around 70° to around 100°, or more preferably in the range of around 75° to around 95°, more preferably in the range of around 85° to around 90°, or most preferably around 85°. Although not shown in FIG. 6, the second arm 72 is substantially identical to the first arm 62, and extends at an angle relative to the body 46 within any of the ranges described above in relation to the first arm 62. The flange 64 may also define an angle relative to the body 46 which lies within the ranges described above in relation to the first arm 62, however in most cases the flange 64 will extend substantially 90° relative to body 46. As such, the flange 64 generally does not provide a gripping function (discussed below), although it will be appreciated that the angle of the flange 64 can be adjusted to do so if desired.

FIG. 7 shows an exploded cross-sectional view of the cell strap 24 and a portion of the second end 40 of the cell housing 18. The upper side 44 of the cell housing 18 defines a first lip 78 and the lower side 42 of the cell housing 18 defines a second lip 80. The first arm 62 and the second arm 64 are spaced apart from one another in the plane defined by the body 46 of the cell strap 24 by an amount that it slightly greater than the distance between uppermost part of the first lip 78 and the lowermost part of the second lip 80.

FIG. 8 shows an assembled view of the cell strap 24 and cell housing 18. During use, the cell strap is pushed onto the cell housing so that the first arm 62 passes over the first lip 78 and the second arm 72 passes over the second lip 80, such that the first detent 68 is received behind the first lip 78 and the second detent 76 is received behind the second lip 80. Because the angle θ of the first arm 62 and second arm 72 relative to the body 46 lies within one of the ranges described above, the first and second arms 62, 72 are able to grip the cell housing 18, and, in particular, ensure that the detents 68, 76 interact with the lips 78, 80 to prevent separation of the cell strap 24 and the cell housing 18. The detents 68, 76 are preferably rounded in shape, and may be for example a "tear" or "heart" shape. The rounded shape of the detents 72, 76 enables the cell strap 24 to be removed from the cell housing 18 under the application of sufficient force, for example if the cell strap 24 needs to be re-positioned. Alternatively, the detents 68, 76 could have sharp-edged geometry (e.g. latch-type geometry) permanently preventing removal of the cell strap 24 from the cell housing 18.

Because the first arm 62 and second arm 72 grip the cell housing 18, this enables the cell strap 24 to be retained on the cell housing 18. Thus, the user can simply and easily align and/or adjust the position of the cell strap 24 relative to the cell housing 18 to ensure that the legs 48 are correctly aligned with the apertures 25 of the cell housing 18 and the poles 17 of the battery cells 16 so that an electrical connection can be formed therebetween.

Figure 9:
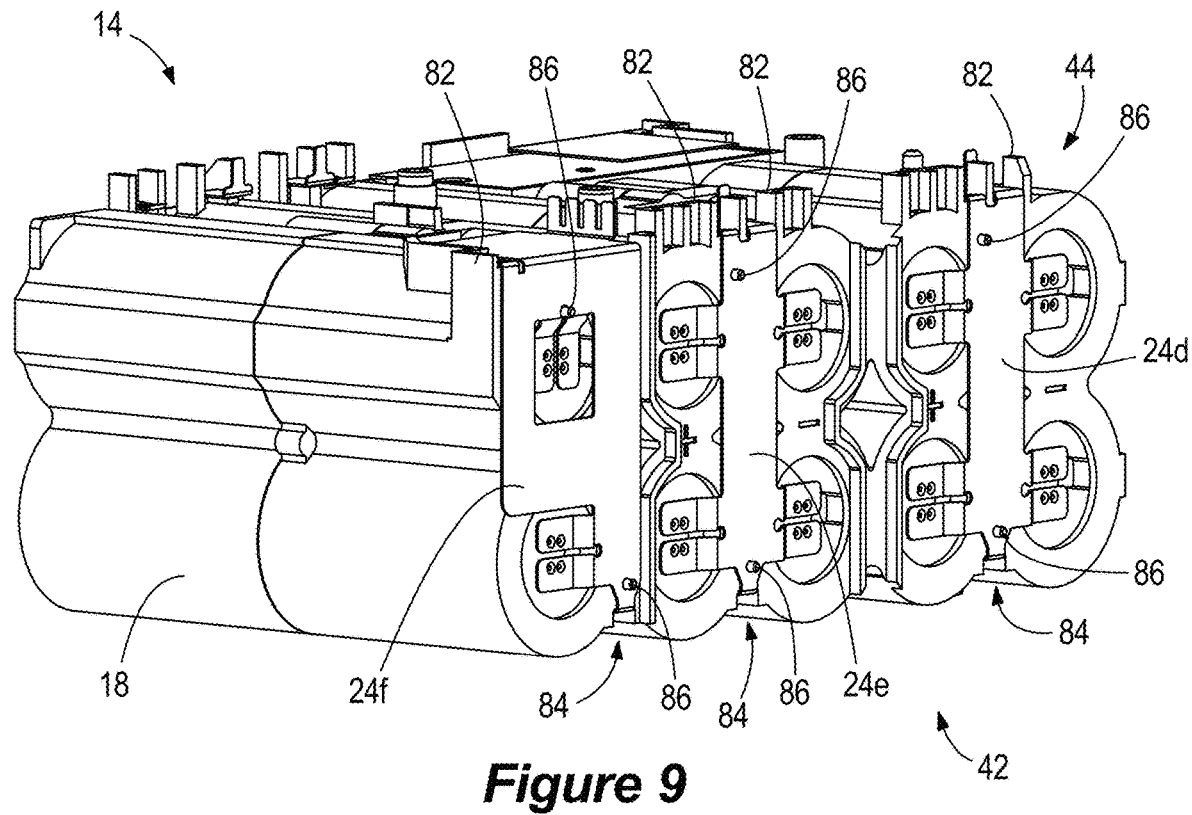
FIG. 9 is a further perspective view of the battery cell assembly of FIG. 2.

FIG. 9 shows a perspective view of the second end 40 of the battery cell assembly 14. The upper side 44 of the cell housing 18 comprises a number of upwardly extending bosses 82. The portion of the upper side 44 of the cell housing 18 between the bosses 82 defines the first lip 78. With reference to the fourth cell strap 24d, during use, the first arm 62 of the fourth cell strap 24d is received between two adjacent bosses 82 defining a channel therebetween. Contact between the bosses 82 and the first arm 62 prevents sideways movement of the fourth cell strap 24d. It will be appreciated that this teaching is applicable to any of the cell straps 24. As such, the bosses 82 are used to ensure that the legs 48 of the cell straps 24 are correctly aligned with the poles 17 of the battery cells 16. It will be appreciated that a corresponding interaction between the flange 64 of the cell strap 24 and the bosses 82 may also provide improved alignment of the legs 48 to the poles 17.

The lower side 42 defines a plurality of recesses 84 which define channels for receiving the second legs 72. The recesses 84 can also be seen in FIGS. 3 and 4. The portion of the lower side 42 of the cell housing 18 within the recesses 84 defines the second lip 80. With reference to the fourth cell strap 24d, during use, the second arm 72 is received within the recess 84. Contact between the sides of the recess and the second arm 72 prevents sideways movement of the fourth cell strap 24d. It will be appreciated that this teaching is applicable to any of the cell straps 24. As such, the recesses 84 are used to ensure that the legs 48 of the cell straps 24 are correctly aligned with the poles 17 of the battery cells 16.

With continued reference to FIG. 9, the cell housing 18 defines a number of protrusions 86. The protrusions 86 extend outwardly from the end faces of the cell housing 18 against which the cell straps 24 lie, and are positioned to be received by the first and second through holes 66, 74 of the cell straps 24. As shown in FIGS. 3 and 4, the protrusions 86 are present on both ends of the cell housing 18. During use, when the cell straps 24 are mounted to the cell housing 18, the protrusions 86 are received by and extend through the through holes 66, 74. The positions of the protrusions 86 and through holes 66, 74 are chosen such that when the protrusions 86 are received by and extend through the through holes 66, 74 the legs 48 of the cell straps 24 will be aligned in their correct positions relative to the poles of the battery cells 16.

During manufacture, the user first inserts the battery cells 16 into the corresponding slots within the cell housing 18 such that the battery cells 16 are supported by the cell housing 18. The user then selects one of the cell straps 24 and inserts the first arm 68 between the corresponding bosses 82 on the upper side 44 of the cell housing 18 and inserts the second arm 72 into the corresponding recess 84 on the lower side 42 of the cell housing. The user pushes the cell strap 24 against the cell housing 18 so that the detents are received by the corresponding lips 78, 80 to secure the cell strap 24 to the cell housing 18. Next, the user ensures that the legs 48 of the cell strap 24 are aligned and in contact with the poles 17 of the battery cells 16 through the apertures 25. If a permanent electrical connection is required, the user then welds or solders the legs 48 to the poles 17.

It will be appreciated that in alternative embodiments the cell straps 24 may not comprise the through holes 66, 74 and the cell housing 18 may not comprise corresponding protrusions 86. In such embodiments, the use of arms and/or flanges is still sufficient to align the cell straps 24 in the desired positions in relation to the cell housing 18. However, in general the alignment will be more stable and precise where protrusions/holes are used in conjunction with arms and/or flanges.

It will be appreciated that in alternative embodiments the cell straps 24 may comprise substantially any suitable selection or combination of detents, arms, flanges and holes for engagement with the cell housing 18 to align the legs 48 of the cell straps 24 relative to the poles 17 of the battery cells 16. Likewise, the cell housing 18 may define substantially any suitable selection or combination of lips 78, 80, bosses 82, recesses 84 and protrusions 86 for engagement with the cell straps 24 to align the legs 48 of the cell straps 24 relative to the poles 17 of the battery cells 16.

More generally, it will be appreciated that the cell straps 24 may define any suitable formation for engaging a co-operating formation of the cell housing 18 so as to align the cell straps 24 in a desired position relative to the cell housing 18. In particular, the cell housing 18 may define a first formation and the cell strap may define a second formation which engages the first formation. The arms, flange, detents and through holes, and any selection or combination thereof, are examples of a first formation. The lips, bosses, recesses and protrusions, and any selection or combination thereof, are examples of a second formation. Such formations of the cell straps 24 and cell housing 18 may have substantially any suitable geometry so as to enable the cell straps 24 to be aligned to a desired position in relation to the cell housing 18.

Furthermore, it will be appreciated that the cell straps 24 may comprise substantially any suitable number of formations for engaging the cell housing 18. The cell straps 24 may further comprise any suitable number of legs for contacting the cells 16, for example two pairs of legs (as in the case of the first and sixth cell straps 24a, 24f) or four pairs of legs (as in the case of the second to fifth cell straps 24b-e).

Figure 10:
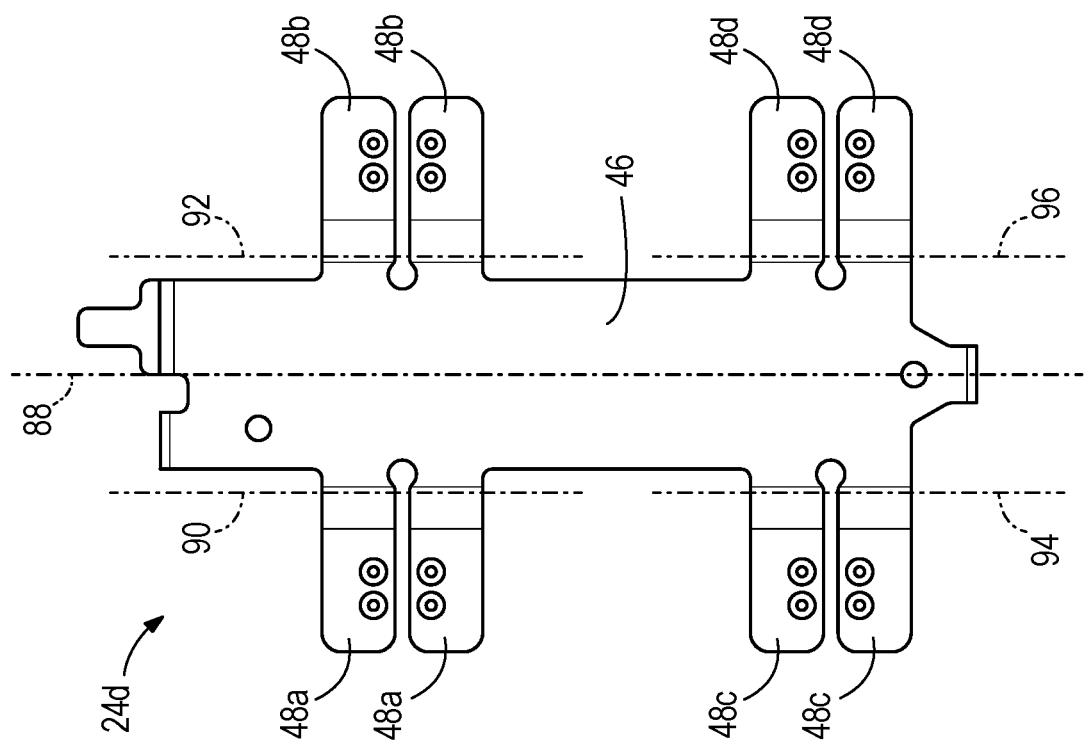
FIG. 10 is a plan view of the cell strap of FIG. 5.

FIG. 10 shows a plan view of the fourth cell strap 24d. The body 46 of the fourth cell strap 24d is elongate and defines a central axis 88. During use, electrical current travels from the first pair of legs 48a to the second pair of legs 48b and from the third pair of legs 48c to the fourth pair of legs 48d in a direction perpendicular to the central axis 88. The first pair of legs 48 may be considered to define a first contact portion for electrically contacting the cells 16. The first pair of legs 48a defines a first flux area relative to a first contact portion axis 90. The first contact axis 90 extends parallel to the central axis 88 and is positioned at the point of maximum total width of the first pair of legs 48a where the legs join the body 46. This corresponds to a position just before the enlarged radiused portion 60. The first flux area is the cross-sectional area of the material of the cell strap 24d taken along the first contact axis 90 perpendicular to the plan of FIG. 10. Likewise, the second, third and fourth pairs of legs 48b-d may be considered to define second to fourth contact portions respectively. The second to fourth pairs of legs 48b-d also define second to fourth flux areas relative to second to a second contact portion axis 92, a third contact portion axis 94 and a fourth contact portion axis 96 respectively, which are positioned in the same manner as the first contact portion axis 90.

The body 46 further defines a body flux area taken along the central axis 88. The body flux area is the cross-sectional area of the material of the cell strap 24d taken along the central axis 88 perpendicular to the plane of FIG. 10. The body flux area is greater than the first to fourth contact portion flux areas. Because the body flux area is greater than the first to fourth contact portion flux areas, the electrical resistance (i.e. impedance) exhibited by the body 46 is relatively low. This means that the fourth cell strap 24d transmits electricity more effectively and is less likely to heat up during use when conducting electricity.

The sum of the first and third contact portion flux areas defines an input flux area (i.e. the total flux area for current being delivered to the body 46), and the sum of the second and fourth contact portion flux areas defines an output flux area (i.e. the total flux area for current being output from the body 46). The input flux area may be substantially equal to the output flux area. Preferably, the body flux area is greater than the input flux area or the output flux area. More preferably, the body flux area is greater than or equal to around 1.5, around 2, or around 3 times the input flux area and/or the output flux area. Generally speaking, the larger the body flux area in comparison to the input and/or output flux areas, the lower the electrical resistance and the less likely the cell strap 24 is to overheat.

Figure 11:
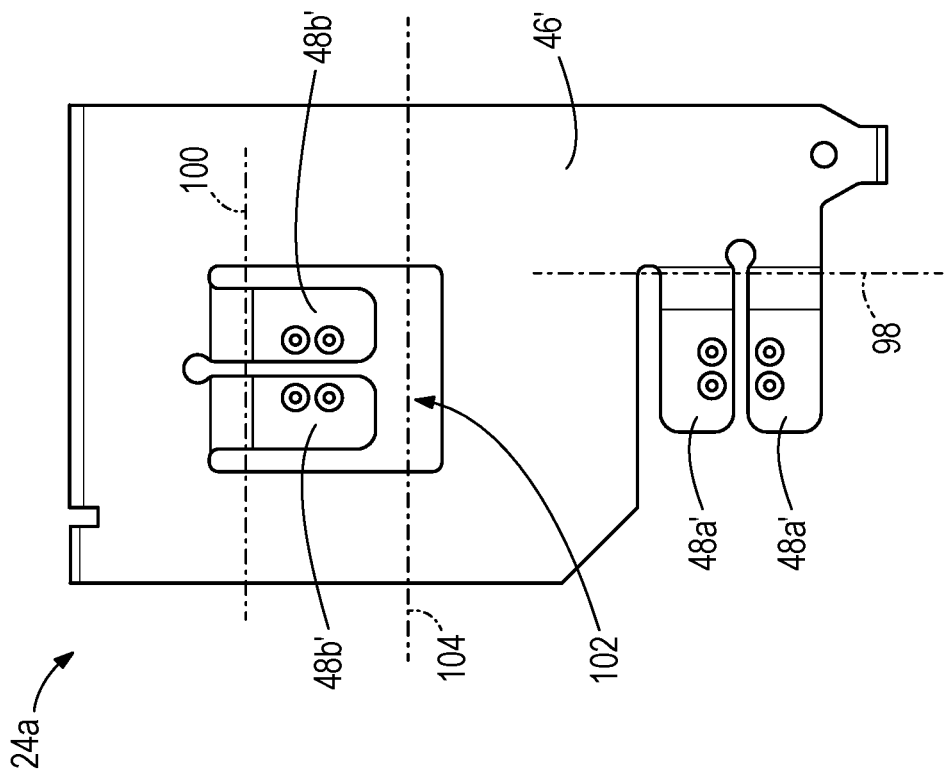
FIG. 11 is a plan view of a further embodiment of a cell strap according to the present invention.

It will be appreciated that the above relationship regarding the input and output flux areas can be applied to any of the first to six cell straps 24a-f. For example, FIG. 11 shows a plan view of the first cell strap 24a. The first cell strap 24a comprises a body 46', a first pair of legs 48a' and a second pair of legs 48b'. The first pair of legs 48a' extend generally horizontally and may be considered to define a first contact portion. The first pair of legs 48a' defines an input flux area along an axis 98 positioned at the join between the legs 48a' and the body 46'. The second pair of legs 48b' extend generally vertically and may be considered to define a second contact portion. The second pair of legs 48b' defines an output flux area along an axis 100 positioned at the join between the legs 48b' and the body 46'. The body 46' defines a cut-out region 102 positioned at generally the centre of the body 46' and into which the second pair of legs 48b' extends. The body 46' defines a body flux area taken along an axis 104. The axis 104 intersects the cut-out region 102 and is perpendicular to the flow of current through the body 46' from the first pair of legs 48a' to the second pair of legs 48b'. As such, the body flux area is composed of two parts, either side of the cut-out region 102. The body flux area is greater than the input flux area or the output flux area.

Figure 12:
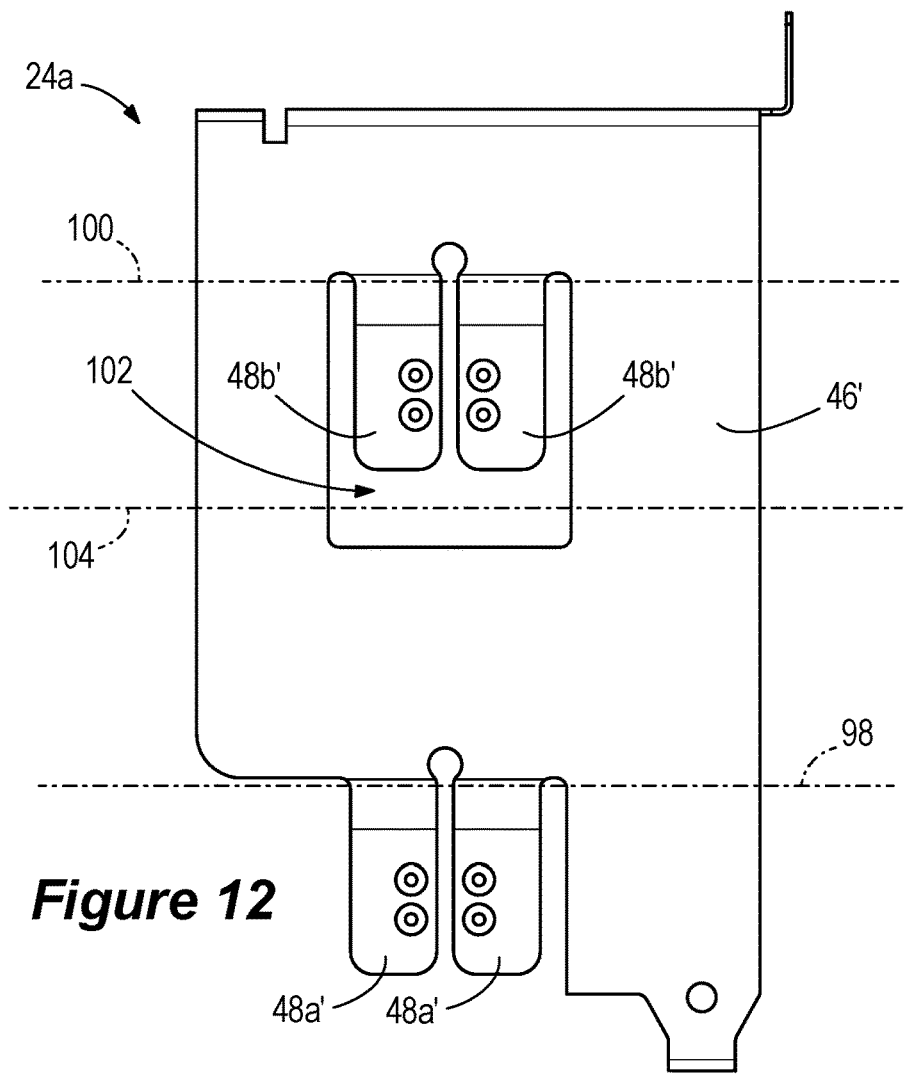
FIG. 12 is a plan view of a further embodiment of a cell strap according to the present invention.

FIG. 12 shows a plan view of an alternative embodiment of the first cell strap 24a. the embodiment of FIG. 12 is similar to the embodiment of FIG. 11, except that the first pair of legs 48a' are oriented generally parallel to the second pair of legs 48b', such that the axis 98 is generally horizontal. The body flux area defined along axis 104 is greater than the input flux area defined by the first pair of legs 48a' or the output flux area defined along the second pair of legs 48b'.

Figure 13:
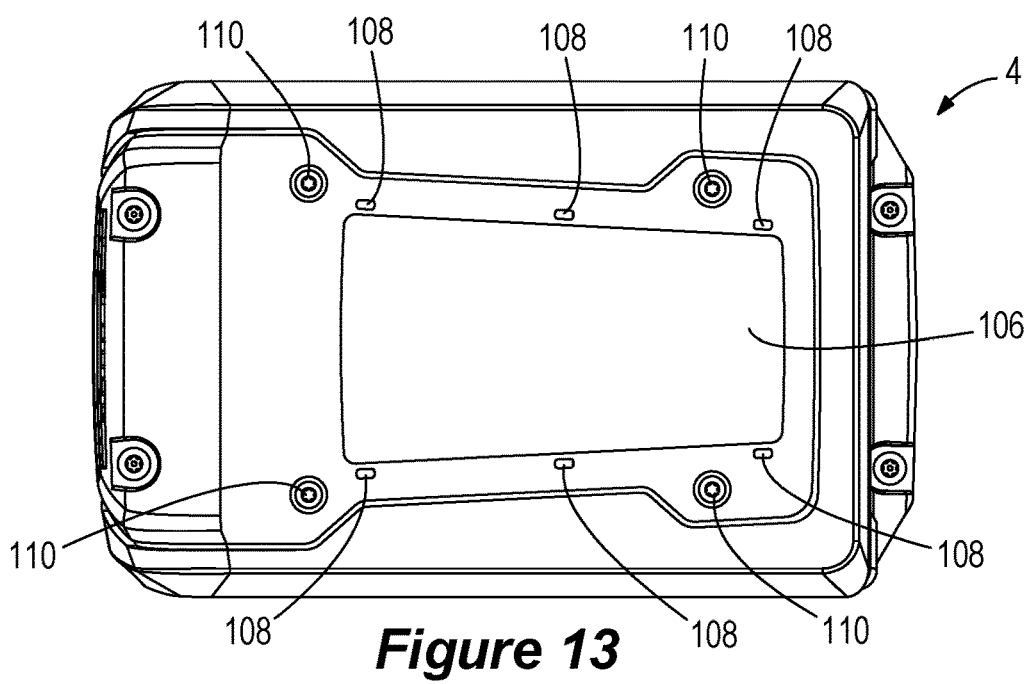
FIG. 13 is a plan view of a bottom side of a main housing of the battery pack according to the present invention.
Figure 14:
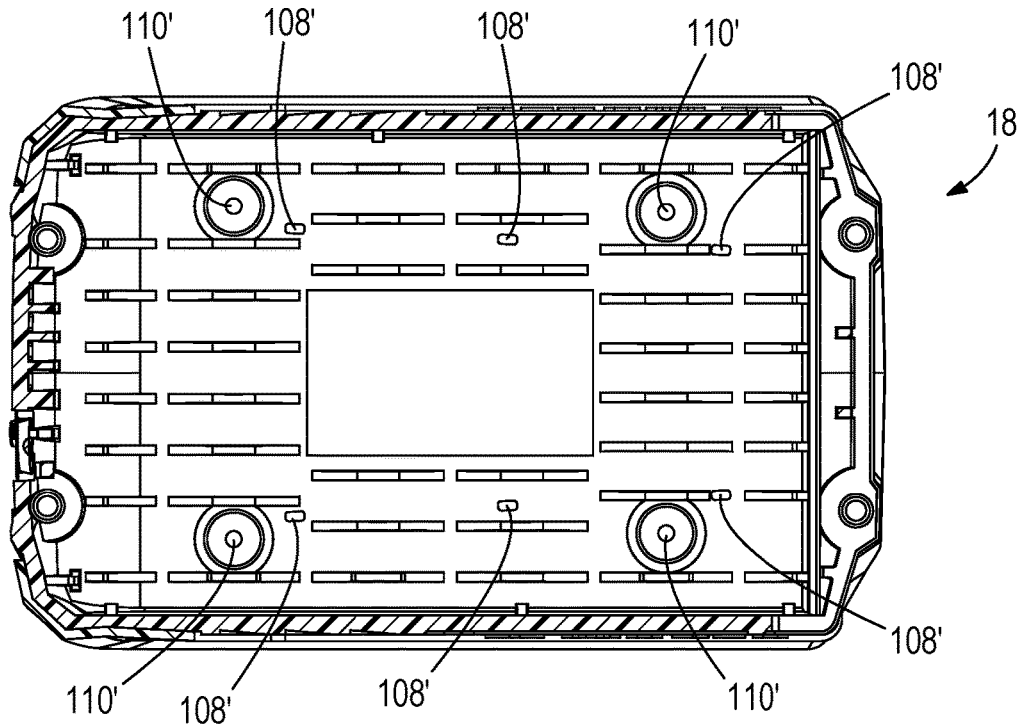
FIG. 14 is a plan view of a bottom side of a cell housing of the battery pack according to the present invention.

FIGS. 13 and 14 show a plan view of a bottom side of the main housing 4 and a bottom side of the cell housing 18 respectively. At a generally central position of the bottom side of the main housing 4 there is a space 106 for sticking a product label of the battery pack 2. Adjacent the longitudinal sides of the space 106 are a number of evenly distributed liquid outlets 108. The same number of liquid outlets 108' is also disposed at the corresponding positions on the cell housing 18 (see FIG. 14) so that each of the liquid outlets 108 overlaps with each of the liquid outlets 108'. Advantageously, in case of accidental liquid splashing onto the battery pack 2 or accidental submergence of the battery pack 2 into a liquid such as water, the liquid outlets 108 and 108' facilitate the drainage of liquid entering the interior of the battery pack 2 so as to minimise corrosion and safety risks of the battery cells 16. It will be appreciated that the liquid outlets can be positioned at the corners, or any other positions of the housing.

Figure 15:
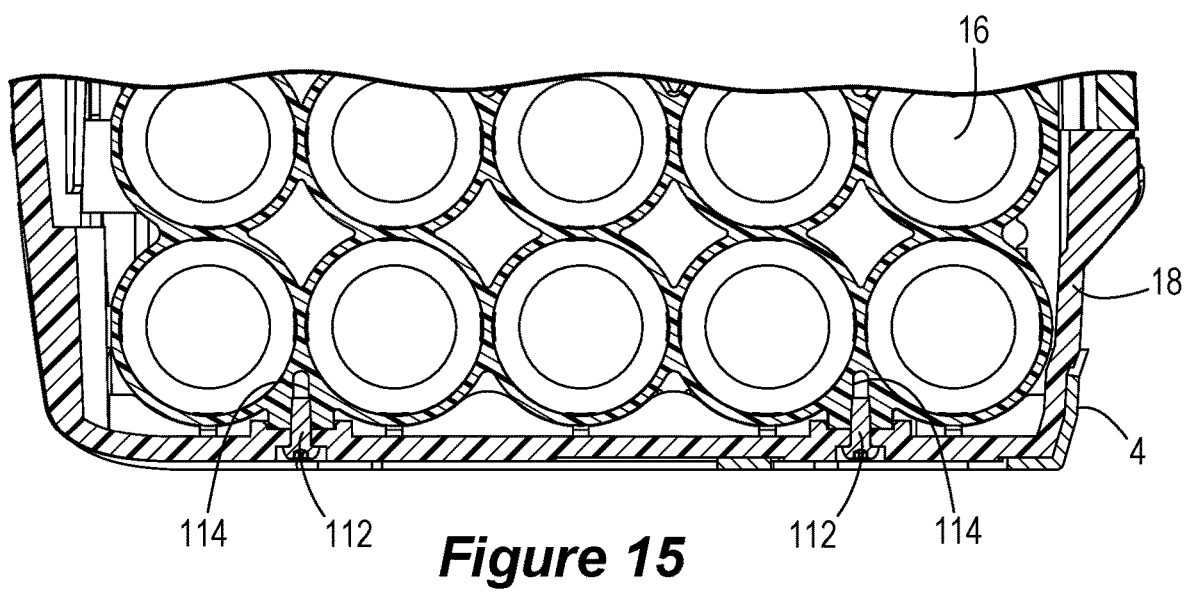
FIG. 15 is a perspective cross-sectional view of the main housing and the cell housing with battery cells according to the present invention.

With continued reference to FIGS. 13 and 14, four screw holes 110 are positioned adjacent the liquid outlets 108 and near the corners of the bottom side of the main housing 4. Four screw holes 110' are also disposed at the corresponding positions on the cell housing 18. FIG. 15 shows a perspective cross-sectional view of the main housing 4 and the cell housing 18 with battery cells 16 after assembly. During assembly of the two housings 4 and 18, a screw 112 is screwed through the screw holes 110 and 110' and is fixed in a screw post 114 formed on the cell housing 18, so that the two housings 4 and 18 become an integrated unit. Advantageously, the formation of an integrated housing helps reduce vibration of the internal components such as the battery cells 16 when the battery pack 2 encounters any impact. The distribution of the screw holes 110 and 110' around the corners of the main housing 4 and the cell housing 18 also helps distribute the impact force evenly. Moreover, a plurality of ribs 116 (see FIG. 14) are formed which extends longitudinally at the bottom side of the cell housing 18 to further strengthen the cell housing 18. A skilled person would appreciate that in addition to screwing, other fastening means such as clamping and sliding are also suitable to fix the cell housing 18 to the main housing 4.

Figure 16:
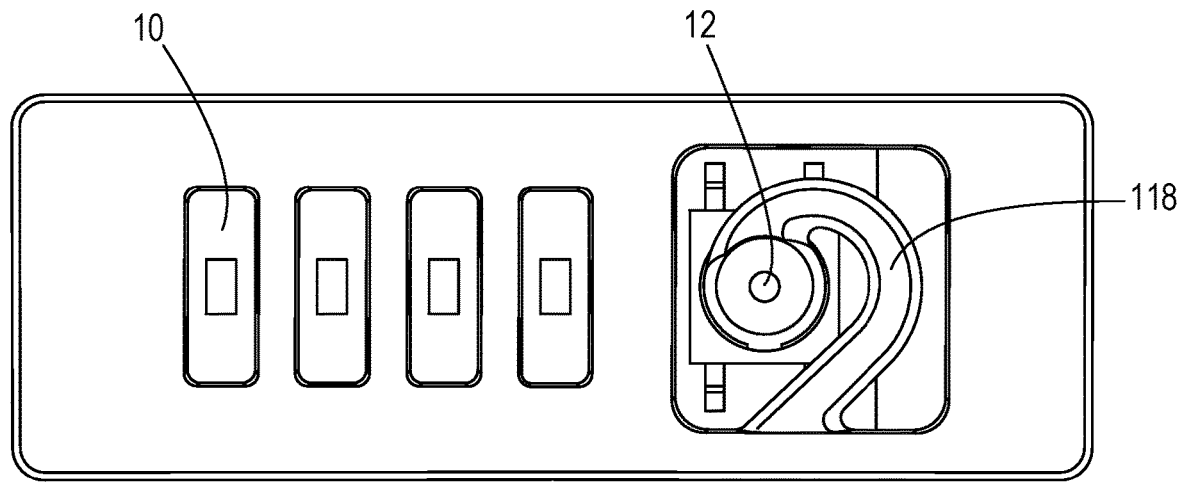
FIG. 16 is a perspective view of the internal structure of an input button according to the present invention.
Figure 17:
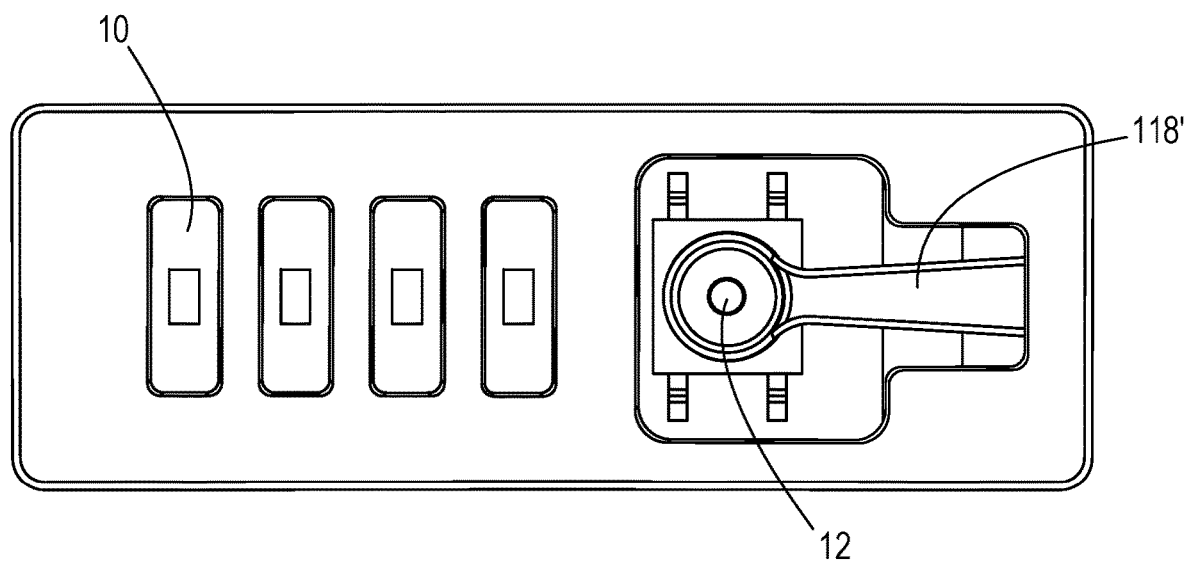
FIG. 17 is a perspective view of a further embodiment of the internal structure of an input button according to the present invention.

FIG. 16 shows a perspective view of the internal structure of the input button 12 with the power level indicators 10. Contrary to common switch buttons having a short arm length which offers an uncomfortable user experience, the arm 118 of the button 12 is configured to a curved shape to provide a longer arm length for a better push button experience. Alternatively, the arm 118' can be configured to be straight and extend horizontally for a longer arm length, as shown in FIG. 17 which shows another embodiment of the button 12.

Figure 18:
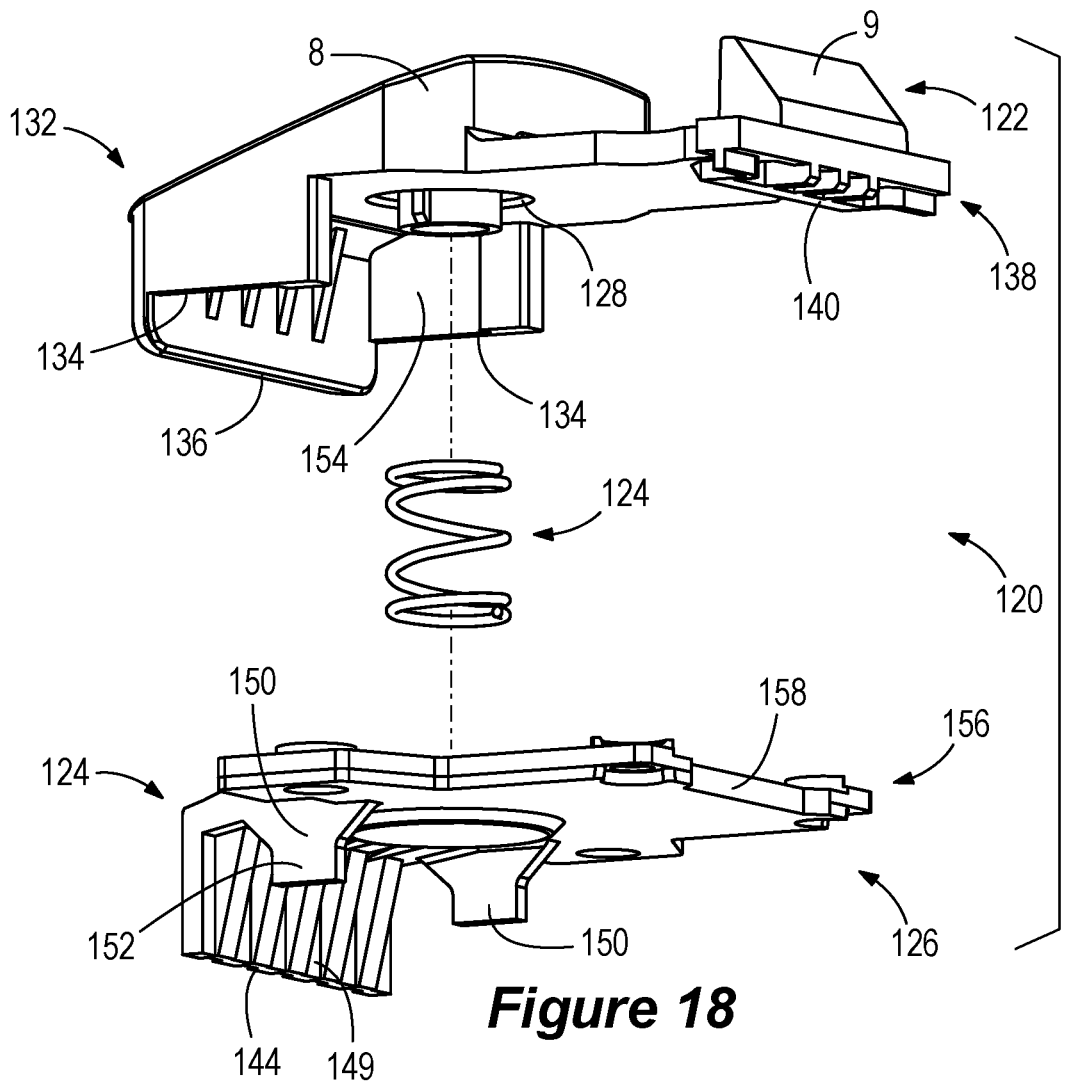
FIG. 18 is an exploded view of a latch mechanism according to the present invention.

FIG. 18 shows an exploded view of the latch mechanism 120 of the battery pack 2. The latch mechanism 120 comprises an upper portion 122 on which the latch button 8 and the latch member 9 are formed, a spring 124 and a lower portion 126. On a bottom side of the upper portion 122 and beneath the latch button 8 is an annular groove 128 for receiving an end of the spring 124. At a first end 132 of the upper portion 122, there are two parallel flange portions 134 extending downwards and being joined at one end by a web portion 136. The web portion 136 is arranged generally perpendicular to the parallel flange portions 134 and extends downwards with a depth larger than that of the flange portions 134. At an opposing second end 138 of the upper portion 122 is a protrusion 140 which extends downwards and is generally parallel to the web portion 136.

Figure 19:
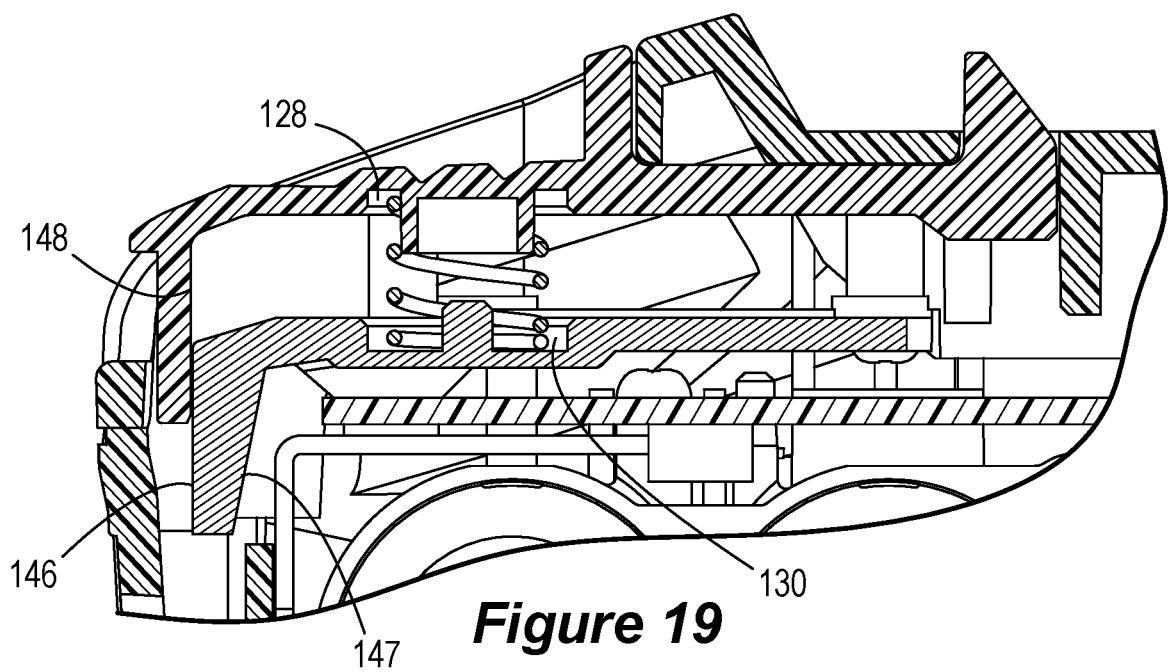
FIG. 19 is a perspective view of the latch mechanism according to the present invention.

With continued reference to FIG. 18 and further reference to FIG. 19, an annular groove 130 is formed on an upper side of the lower portion 126 for receiving an opposite end of the spring 124. At a first end 142 of the lower portion 126, a block 144 in the form of a downwardly depending flange is formed which extends downwards and has an outer surface 146 parallel and complementary to an inner surface 148 of the web portion 136. Both the outer surface 146 and an inner surface 147 of the block 144 are formed with a plurality of slots 149 which extend vertically. Adjacent to the lateral sides of the block 144 are two respective ribs 150 extending downwards and being arranged generally perpendicular to the block 144. Similar to the block 144, each of the ribs 150 has an outer surface 152 parallel and complementary to an inner surface 154 of the flange portion 134. An opposing second end 156 of the lower portion 126 is formed with a notch 158 having a shape complementary to the protrusion 140 of the upper portion 122.

During assembly of the latch mechanism 120, the upper portion 122 and the lower portion 126 sandwich the spring 124 so that each of the two ends of the spring 124 are received in the annular grooves 128 and 130 respectively. The outer surface 146 and the outer surfaces 152 are configured to abut the inner surface 148 and the inner surfaces 154 respectively after assembly. The notch 158 also matches with the protrusion 140 after assembly. Effectively, the abutment of the web portion 136 and the block 144, as well as the abutment of the flange portions 134 and the ribs 150 help restrict the actuation of the latch button 8 to be linear motion only. By avoiding front and rear or left to right motion of the latch button 8 during actuation, the risk of breakage and accidental displacement of the spring 124 from the grooves can be reduced so that the lifespan of the latch mechanism 120 may be prolonged. The slots 149 on the outer surface 146 help reduce the contact area with the inner surface 148 so that user experience may be improved by reducing the friction experienced by the user when he/she presses the latch button 8.

Figure 20:
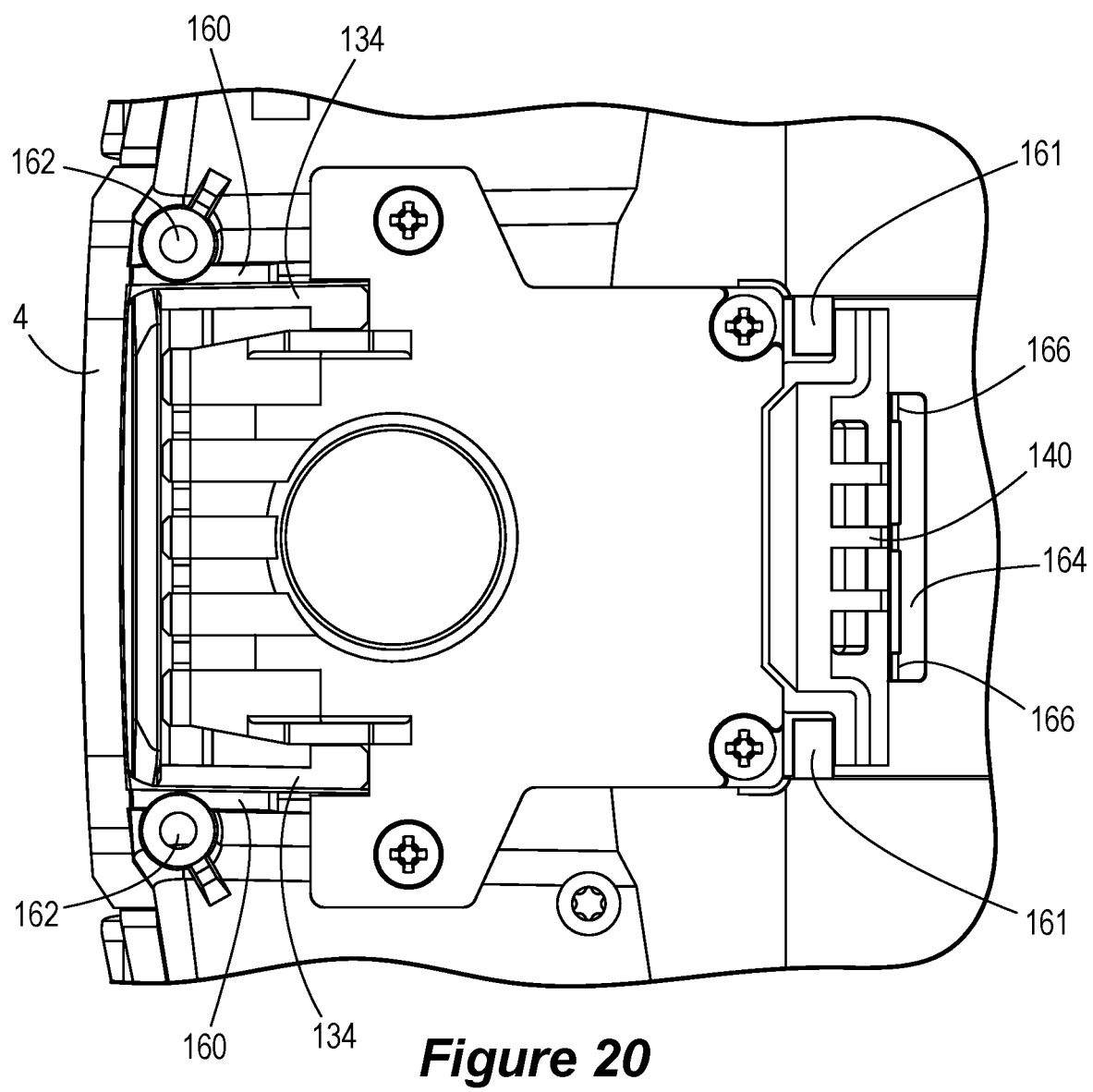
FIG. 20 is a plan bottom view of the latch mechanism assembled with the main housing according to the present invention.

FIG. 20 shows a plan bottom view of the latch mechanism 120 assembled with the main housing 4. On the inner side of the main housing 4 there are two parallel ribs 160 extending longitudinally and being disposed adjacent two screw holes 162 at the corners, and two ribs 161 disposed adjacent the stepped surfaces of the protrusion 140. There is also an elongated rib 164 extending transversely having a plurality of protrusions 166. After assembly of the latch mechanism 120 with the main housing 4, the flange portions 134 abut the ribs 160, the ribs 161 abut the stepped surfaces of the protrusion 140, and the protrusion 140 abuts the protrusions 166 of the rib 164. With such configuration, the position of the latch mechanism 120 is secured in the main housing 4 and the actuation of the latch button 8 is limited to be linear motion only without undesired rotations. The protrusions 166 also help reduce the contact area with the second end 138 so that the friction experienced during pressing the latch button 8 can be reduced.

Figure 21:
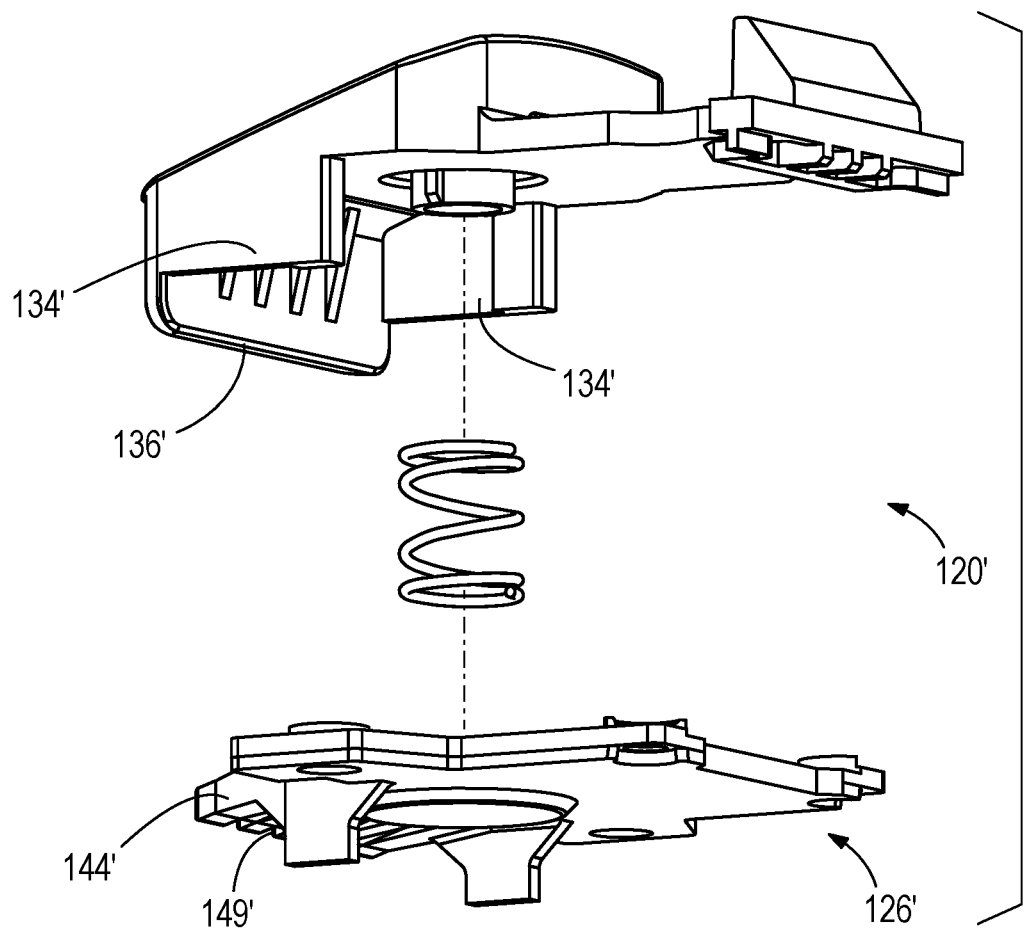
FIG. 21 is an exploded view of a further embodiment of a latch mechanism according to the present invention.
Figure 22:
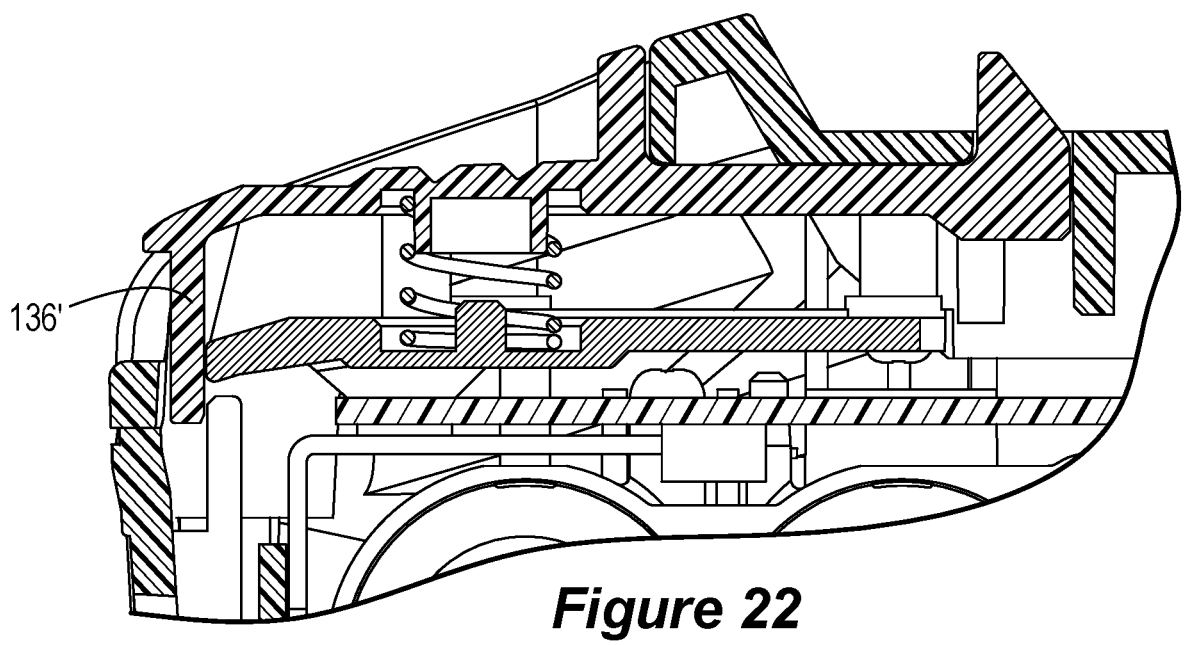
FIG. 22 is a perspective view of a further embodiment of the latch mechanism according to the present invention.

FIGS. 21 and 22 show another embodiment of the latch mechanism 120'. The main difference lines in the block 144' which is configured to be slightly declined from the plane of the lower portion 126'. Such arrangement can also provide the same technical effect to the latch button 8 by having the block 144' abutting the flange and web portions 134', 136', and having slots 149' on the block 144'.

Although the battery cell assembly 14 has been described in relation to a removable battery pack 2, it will be appreciated that the battery cell assembly 14 may be incorporated into substantially any battery pack, and in particular a battery pack integrated into a power tool.

The invention claimed is:

1. A battery cell assembly for a power tool battery pack, the battery cell assembly comprising:
   a cell housing;
   a circuit board supported by the cell housing;
   a battery cell defining a pole and being supported by the cell housing; and
   a cell strap comprising a body having:
      a first end,
      a second end opposite the first end,
      a pair of legs extending outwardly from the body towards the pole of the battery cell, each leg of the pair of legs electrically contacting the pole, the legs of the pair of legs being separated by a first gap, and
      a flange extending from the first end of the body in a first direction and including a terminal configured to form an electrical connection with the circuit board such that the cell strap is in electrical communication with the circuit board;
   wherein
   the cell housing defines a first formation and the cell strap includes an arm extending from the first end in the first direction, the arm being spaced apart from the flange in a second direction by a second gap, the arm defining a second formation configured to engage the first formation so as to align each leg of the pair of legs with the pole,
   wherein the flange extends from the first end of the body at a first angle and the arm extends from the first end of the body at a second angle that is different than the first angle, such that the arm is configured to grip the cell housing.

2. The battery cell assembly according to claim 1, wherein one of the first and second formations comprises a detent, and wherein another of the first and second formations receives the detent.

3. The battery cell assembly according to claim 2, wherein the other of the first and second formations comprises a lip or a recess for retaining the detent.

4. The battery cell assembly according to claim 2, wherein the detent is defined by the arm.

5. The battery cell assembly according to claim 4, wherein the first formation defines a channel configured to receive the arm to limit movement of the cell strap relative to the cell housing.

6. The battery cell assembly according to claim 5, wherein the cell housing comprises a boss at least partially defining the channel.

7. The battery cell assembly according to claim 5, wherein the cell housing comprises a recess defining the channel.

8. The battery cell assembly according to claim 4, wherein the body is substantially planar and is positioned against an end face of the cell housing, and wherein the arm extends generally orthogonal to the body.

9. The battery cell assembly according to claim 8, wherein the second angle is around 70° to around 100° relative to the body.

10. The battery cell assembly according to claim 9, wherein the second angle is around 75° to around 95° relative to the body.

11. The battery cell assembly according to claim 10, wherein the second angle is around 85° relative to the body.

12. The battery cell assembly according to claim 1, wherein either the cell housing or the cell strap comprises a through hole and wherein another of the cell housing or the cell strap comprises a correspondingly shaped protrusion received by the through hole.

13. The battery cell assembly according to claim 1, wherein the flange extends generally orthogonal to the body and the terminal extends generally parallel with the body.

14. The battery cell assembly according to claim 1, wherein the cell housing comprises a boss or a channel that engages the flange to limit movement of the cell strap relative to the cell housing.

15. The battery cell assembly according to claim 1, wherein the cell housing defines an aperture aligned with the pole of the battery cell.

16. The battery cell assembly according to claim 1, wherein the battery cell is a first battery cell and wherein the pole is a first pole, and further including a second battery cell having a second pole, and wherein the pair of legs is a first pair of legs and the cell strap further includes a second pair of legs extending outwardly from the body in a direction opposite the first pair of legs and towards the second pole of the second battery cell, each leg of the second pair of legs electrically contacting the second pole, the legs of the second pair of legs being separated by a third gap, wherein when the first formation engages the second formation) each leg of the second pair of legs is aligned with the second pole.

17. The battery cell assembly according to claim 1, wherein the arm is a first arm and wherein the cell housing defines a third formation and the cell strap comprises a second arm extending from the second end that defines a fourth formation configured to engage the third formation so as to align each leg of the pair of legs with the pole.

18. The battery cell assembly according to claim 17, wherein the cell housing comprises a first side and a second side opposite the first side, and wherein the first side defines the first formation and the second side defines the third formation.

19. The battery cell assembly according to claim 17, wherein the second end defines the fourth formation.

20. A method of manufacturing a cell assembly for a battery pack, the method comprising:
   providing a cell housing having a first formation;
   providing a circuit board supported by the cell housing;
   supporting a battery cell using the cell housing;
   providing a cell strap comprising a body including
      a first end,
      a second end opposite the first end,
      a second formation and defined by an arm extending from the first end in a first direction,
      a pair of legs extending outwardly from the body towards the battery cell, legs of the pair of legs being separated by a first gap, and
      a flange extending from the first end in the first direction, the flange being spaced apart from the arm in a second direction by a second gap, the flange comprising a terminal configured to form an electrical connection with the circuit board such that the cell strap is in electrical communication with the circuit board;
   engaging the first formation with the second formation to align each of the legs of the pair of legs with a pole of the battery cell; and
   creating an electrical connection between each leg of the pair of legs and the pole,
   wherein the flange extends from the first end of the body at a first angle and the arm extends from the first end of the body at a second angle that is different than the first angle, such that the arm is configured to grip the cell housing.

21. The method according to claim 20, wherein creating an electrical connection comprises permanently joining each of the legs of the pair of legs to the pole.

22. The method according to claim 21, wherein permanently joining each leg of the pair of legs to the pole comprises welding or soldering each leg of the pair of legs to the pole.

23. The method according to claim 20, wherein the cell housing comprises an aperture and wherein the method further comprises aligning the pole with the aperture.

24. The battery cell assembly according to claim 16, wherein the first pole is a positive pole and the second pole is a negative pole.

25. The battery cell assembly according to claim 1, wherein the cell housing includes a first side and a second side opposite the first side, wherein the battery cell is a first battery cell and the pole is a first pole, and wherein the cell strap is a first cell strap, and wherein the body is a first body, and the pair of legs is a first pair of legs, and further comprising
a second battery cell defining a second pole and being supported by the cell housing;
a second cell strap comprising a second body having a second pair of legs extending outwardly from the second body towards the second pole of the second battery cell, each leg of the second pair of legs electrically contacting the second pole;
wherein the cell housing defines a third formation and the second cell strap defines a fourth formation that engages the third formation to align each leg of the second pair of legs with the second pole, and
wherein the first cell strap and the second cell strap are positioned on the first side of the cell housing.

26. The battery cell assembly according to claim 25, wherein the second cell strap defines a second terminal configured to form a second electrical connection with the circuit board.

27. The battery cell assembly according to claim 1, wherein each leg of the pair of legs contacts the pole such that each leg of the pair of legs electrically contacts the pole.

28. A battery cell assembly for a power tool battery pack, the battery cell assembly comprising:
a cell housing;
a circuit board supported by the cell housing;
a battery cell defining a pole and being supported by the cell housing; and
a cell strap comprising a body having:
a first end,
a second end opposite the first end,
a leg extending outwardly from the body towards the pole of the battery cell, the leg electrically contacting the pole,
a flange extending from the first end of the body in a first direction and including a terminal configured to form an electrical connection with the circuit board such that the cell strap is in electrical communication with the circuit board;
wherein the cell housing defines a first formation and the cell strap includes an arm extending in the first direction from the first end, the arm being spaced apart from the flange in a second direction by a second gap, the arm defining a second formation configured to engage the first formation so as to align the leg with the pole, wherein the flange extends from the first end of the body at a first angle and the arm extends from the first end of the body at a second angle that is different than the first angle, such that the arm is configured to grip the cell housing.

29. The battery cell assembly according to claim 28, wherein the flange extends generally orthogonal to the body and the terminal extends generally parallel with the body.

30. The battery cell assembly according to claim 29, wherein the arm is a first arm and wherein the cell housing defines a third formation and the cell strap comprises a second arm extending from the second end that defines a fourth formation configured to engage the third formation so as to align the leg with the pole.

31. The battery cell assembly according to claim 30, wherein the cell housing comprises a first side and a second side opposite the first side, and wherein the first side defines the first formation and the second side defines the third formation.

32. The battery cell assembly according to claim 28, wherein one of the first and second formations comprises a detent, and wherein another of the first and second formations receives the detent.

33. The battery cell assembly according to claim 32, wherein the other of the first and second formations comprises a lip or a recess for retaining the detent.

34. The battery cell assembly according to claim 32, wherein the detent is defined by the arm.

35. The battery cell assembly according to claim 34, wherein the first formation defines a channel configured to receive the arm to limit movement of the cell strap relative to the cell housing.

36. The battery cell assembly according to claim 35, wherein the cell housing comprises a boss at least partially defining the channel.

37. The battery cell assembly according to claim 35, wherein the cell housing comprises a recess defining the channel.

38. The battery cell assembly according to claim 34, wherein the body is substantially planar and is positioned against an end face of the cell housing, and wherein the arm extends generally orthogonal to the body.

39. The battery cell assembly according to claim 38, wherein the second angle is around 70° to around 100° relative to the body.

40. The battery cell assembly according to claim 38, wherein the second angle is around 75° to around 95° relative to the body.

41. The battery cell assembly according to claim 38, wherein the second angle is around 85° relative to the body.

42. The battery cell assembly according to claim 28, wherein either the cell housing or the cell strap comprises a through hole and wherein another of the cell housing or the cell strap comprises a correspondingly shaped protrusion received by the through hole.

43. The battery cell assembly according to claim 28, wherein the flange extends generally orthogonal to the body and the terminal extends generally parallel with the body.

44. The battery cell assembly according to claim 28, wherein the cell housing comprises a boss or a channel that engages the flange to limit movement of the cell strap relative to the cell housing.

45. The battery cell assembly according to claim 28, wherein the cell housing defines an aperture aligned with the pole of the battery cell.

46. The battery cell assembly according to claim 28, wherein the battery cell is a first battery cell and wherein the pole is a first pole, and further including a second battery cell having a second pole, and wherein the leg is a first leg and the cell strap further includes a second leg extending outwardly from the body in a direction opposite the first leg and towards the second pole of the second battery cell, the second leg electrically contacting the second pole, wherein when the first formation engages the second formation the second leg is aligned with the second pole.

* * * * *